(12) United States Patent
Elazhary et al.

(10) Patent No.: US 11,202,043 B1
(45) Date of Patent: Dec. 14, 2021

(54) SELF-TESTING DISPLAY DEVICE

(71) Applicant: Facebook Technologies, LLC, Menlo Park, CA (US)

(72) Inventors: Tamer Elazhary, Redmond, WA (US); Nicholas Trail, Bothell, WA (US); Brian Wheelwright, Sammamish, WA (US); Weichuan Gao, Redmond, WA (US); Jacques Gollier, Bellevue, WA (US); Barry David Silverstein, Kirkland, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/002,277

(22) Filed: Aug. 25, 2020

(51) Int. Cl.
| | | |
|---|---|---|
| *H04N 17/00* | (2006.01) | |
| *H04N 9/31* | (2006.01) | |
| *F21V 8/00* | (2006.01) | |
| *G02B 27/01* | (2006.01) | |

(52) U.S. Cl.
CPC ......... *H04N 9/3191* (2013.01); *G02B 6/0016* (2013.01); *G02B 6/0036* (2013.01); *G02B 27/0172* (2013.01); *G02B 27/0176* (2013.01); *H04N 17/004* (2013.01); *G02B 2027/015* (2013.01)

(58) Field of Classification Search
CPC .. H04N 9/3191; H04N 17/004; G02B 6/0016; G02B 6/0036; G02B 27/0176; G02B 27/0172; G02B 2027/015

USPC ......................................................... 348/177
See application file for complete search history.

(56) References Cited

U.S. PATENT DOCUMENTS

| | | | | |
|---|---|---|---|---|
| 2017/0277259 | A1* | 9/2017 | Mullins | G02B 27/0172 |
| 2018/0080803 | A1* | 3/2018 | Kaehler | G01D 5/268 |
| 2019/0204602 | A1* | 7/2019 | Wu | G02B 6/0055 |
| 2020/0018968 | A1* | 1/2020 | Edwin | G02B 27/0172 |
| 2020/0233213 | A1* | 7/2020 | Porter | H04N 13/344 |
| 2020/0278544 | A1* | 9/2020 | Poulad | G02B 6/4214 |
| 2020/0358528 | A1* | 11/2020 | Hunt | G02B 6/4204 |
| 2021/0012753 | A1* | 1/2021 | Zhang | G01K 13/00 |
| 2021/0103146 | A1* | 4/2021 | Travers | G02B 6/0076 |
| 2021/0149203 | A1* | 5/2021 | Chen | G02B 27/0172 |

* cited by examiner

*Primary Examiner* — Michael Lee
(74) *Attorney, Agent, or Firm* — Pequignot + Myers; Matthew A. Pequignot

(57) ABSTRACT

A self-calibrating display can detect and compensate for binocular disparity or other visual imperfection of the display. The display includes a pair of projection units for projecting test light carrying test images through waveguides, which are normally used to carry images to left and right eyes of a user. A detection unit detects the test light propagated through the waveguides, and extracts the test images. Position of reference features in the detected test images may be used to determine binocular disparity, and luminance and color distribution across the test images may be used to determine the illumination and color uniformity of the images displayed to the user. After the visual defects have been detected, they may be reduced or compensated for by pre-emphasizing or shifting images to be displayed to the left and right eyes of the user.

29 Claims, 16 Drawing Sheets

(a)

(b)

(c)

(d)

(e)

SELF-TESTING DISPLAY DEVICE

TECHNICAL FIELD

The present disclosure relates to visual display systems, their components and modules, and in particular to optical sensors used in visual display systems.

BACKGROUND

Visual displays are used to provide information to viewer(s) such as text, images, videos, etc. Visual displays are finding applications in diverse fields including entertainment, education, training, and science, to name just a few examples. Some visual displays, such as TV sets, may display images to several users, and some visual display systems may be intended for individual users. Head mounted displays (HMD), near-eye displays (NED), and the like are being used increasingly for displaying content to individual users, including virtual reality (VR) content, augmented reality (AR) content, mixed reality (MR) content, etc. The displayed VR/AR/MR content can be three-dimensional (3D) to enhance the experience and to match virtual objects to real objects in the user's environment.

Compact display systems are desired for head-mounted displays. Because a display of HMD or NED is usually worn on the head of a user, a large, bulky, unbalanced, and/or heavy display device would be cumbersome and may be uncomfortable for the user to wear. Compact displays, however, may have other limitations and drawbacks related to quality of the displayed imagery, power consumption, thermal management, mechanical stability, robustness, etc.

BRIEF DESCRIPTION OF THE DRAWINGS

Exemplary embodiments will now be described in conjunction with the drawings, in which.

DETAILED DESCRIPTION

Figure 1A:
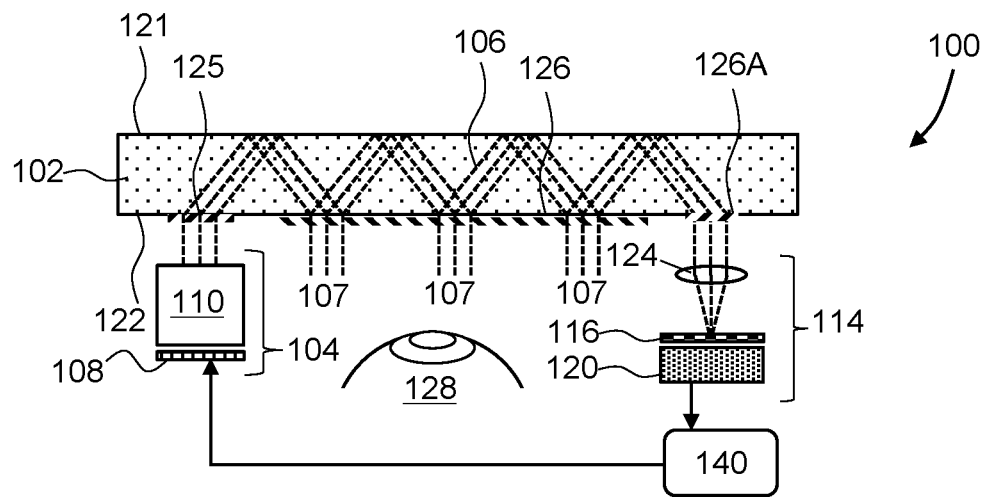
FIG. 1A is a side cross-sectional view of an apparatus for determining a waveguide tilt in accordance with this disclosure.
Figure 1A:
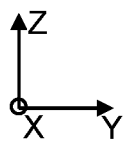

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1A, 5, 6, 7A, 7B, FIG. 11, and FIGS. 13-17, similar reference numerals denote similar elements.

It is desirable to reduce the form factor of an AR or VR headset, including a thickness of the eye brow region of the headset. The thickness may be reduced by rear mounting of image projectors, i.e. mounting the projectors at the eye side.

Placing the projector on the eye side has its drawbacks, however. A near-eye display may include a waveguide that spreads image light from a projector across an eyebox of the AR glasses. In an AR headset, the waveguide may be made transparent or translucent to provide the view of the outside world while observing the AR imagery generated by the projector. When the projector is on the eye side, misalignment between waveguide and projector may cause the image generated for left and right eyes of the user to shift relative to one another, causing the AR image to double in the viewer's eyes—an unpleasant and distracting effect known as binocular disparity. Misalignments include relative tip, tilt, and clocking. Other visual defects, such as illumination and/or color mismatch or non-uniformity, may also be present.

In accordance with this disclosure, the image defects or imperfections in a near-eye display may be evaluated by the display itself in real time, and the images generated by the left and right eye projectors may be adjusted to compensate. This enables binocular disparity caused by the misalignment between waveguides and the projectors to be lessened, or even completely eliminated, which in its turn facilitates placing the image projectors on the eye side, thereby reducing the form factor of a display. This also enables one to consistently generate uniform, true-color images to both eyes of the user.

An apparatus for detecting visual imperfections comprises a projector, a waveguide, and a detector. The projector can be the existing image projector operating in the visible range of the spectrum to display images to the user. It may be as well an additional, dedicated projector operating at the invisible range of the spectrum, such as near-infrared (NIR) range, for example.

The detector can include multi- or single pixel detector with an amplitude mask, also termed a reticle, placed in front, i.e. upstream of, the photodetector. The detection method may be based on measuring relative movement of the left and right images. The left and right images may be any augmented reality (AR) images. They may be a part of the imagery being displayed, or they may include some artificial alignment signs or markers, which may be made inconspicuous and/or placed outside of a field of view (FOV) of a display. Accuracy and noise robustness can be improved via projecting a set of patterns displaced with pre-defined offsets. Specific projected patterns may include periodic line spatial patterns that are projected onto an amplitude mask including matching line patterns followed by single pixel detector, an array of single-pixel detectors, or a pixelated detector array.

A self-calibrating display device may include projection units providing test light carrying test images for left and right sides of the display. A detection unit may receive the test light out-coupled from the waveguides, and may detect and compare the test images. Various imperfections and visual defects of the display including binocular disparity, color and illumination uniformity, etc., may be determined and compensated.

In accordance with the present disclosure, there is provided a display device comprising first and second projection units for providing test light carrying first and second test images, respectively. First and second waveguides propagate image light carrying images to be displayed to left and right eyes of a user respectively. The first and second waveguides each comprise an in-coupling area for in-coupling the test light from the respective projection unit, and an out-coupling area for out-coupling the test light from the waveguide. A detection unit receives the test light out-coupled from the first and second waveguides, and detects the first and second test images. In some embodiments, the display device is a headset to be worn on a head of the user, the first and second projection units are located in a temporal region of the headset, and the detection unit is located in a nasal region of the headset.

In embodiments where the test light is in a visible wavelength range of between 380 nm and 700 nm, the first and second projection units may be configured for providing the image light and the test light in a time-sequential manner. The image light may carry first and second modified images such that, for each eye of the user, a sum of the respective modified image and the respective test image equals to an image to be displayed to the eye of the user. The detection unit may be synchronized with providing the test light by the first and second projection units, for detecting the first and second test images substantially independently on the images to be displayed to the eyes of the user. The first and second test images may each include reference features having an angular size of less than 1 degree and located within a field of view of the images to be displayed to the left and right eyes of the user.

In embodiments where the first and second test images each comprise periodic features, the detection unit may include an objective for forming at least one of the first and second test images at a focal plane of the objective; a mask at the focal plane, the mask comprising periodic features; and a photodetector downstream of the mask for detecting the test light propagated through the mask. In some embodiment, the detection unit may include an objective for forming the first and second test images at a focal plane of the objective, and at least one photodetector array at the focal plane for detecting the first and second test images. The detection unit may further include an optical combiner including first and second in-coupling areas optically coupled to the out-coupling areas of the first and second waveguides respectively, and an out-coupling area optically coupled to the objective, for directing the test light out-coupled from the first and second waveguides to the objective of the detection unit. The optical combiner may include a waveguide having the first and second in-coupling areas at opposed ends of the waveguide, and the out-coupling area between the first and second in-coupling areas. In some embodiments, the optical combiner may include first and second prismatic elements having the first and second in-coupling areas, respectively, and having first and second out-coupling areas, respectively. The out-coupling areas of the first and second prismatic elements may be disposed proximate each other, forming the out-coupling area of the optical combiner.

In some embodiments, the detection unit comprises first and second objectives for forming the first and second test images, respectively, at focal planes of the first and second objectives, respectively. First and second sensing units may be disposed at the focal planes of the first and second objectives respectively, for detecting the first and second test images, respectively. A mechanical structure may rigidly support the first and second objectives and the first and second sensing units in a spaced-apart relationship. In such embodiments, each one of the first and second sensing units may include an objective for forming a respective one of the first and second test images at a focal plane of the objective, a mask at the focal plane, and a photodetector downstream of the mask for detecting the test light propagated through the mask. The first and second sensing units may each include an objective for forming the respective one of the first and second test images at a focal plane of the objective, and a photodetector array at the focal plane for detecting the respective test images.

A display device of this disclosure may further include a controller operably coupled to the detection unit. The first and second test images may each comprise a reference feature having a pre-defined position. The controller may be suitably configured to determine visual disparity between images displayed to left and right eyes of the user by comparing the positions of the reference features in the first and second test images detected by the detection unit. The first and second test images may each comprise a pre-defined distribution of at least one of luminance or color across a field of view of the display device. The controller may be configured to determine at least one of luminance or color uniformity across the field of view of the display device based on the test images detected by the detection unit.

In accordance with the present disclosure, there is provided a display device comprising first and second projection units for providing image light carrying images to be displayed to left and right eyes of a user respectively, and test light carrying first and second test images, respectively. First and second waveguides propagate both the image light and the test light provided by the first and second projection units respectively. The first and second waveguides each include an in-coupling area for in-coupling the test light from the respective projection unit, and an out-coupling area for out-coupling the test light from the waveguide. A detection unit receives the test light out-coupled from the first and second waveguides, and detects the first and second test images.

In embodiments where the test light is in a visible wavelength range of between 380 nm and 700 nm, the detection unit may include an objective for forming at least one of the first or second test images at a focal plane of the objective. The detection unit may further include at least one color-selective photodetector array at the focal plane of the objective for detecting the test light emitted by at least one of the first or second projection units. The detection unit may further include a wavelength-dispersive device disposed proximate the objective for angularly dispersing the test light into separate wavelength components of the test light. The wavelength-dispersive device may include a diffraction grating. The detection unit may further include a photodetector array at the focal plane of the objective for individual detection of the wavelength components of the test light.

In embodiments where image light emitted by the first and second projection units is within a wavelength range of between 360 nm and 700 nm, and the test light emitted by the first and second projection units is within an invisible wavelength range, e.g. between 700 nm and 1100 nm, the first and second projection units may each include a 2D array of emitters, some emitters of the 2D array of emitters emitting the image light and some emitters of the 2D array of emitters emitting the test light. The first and second projection units may each include visible light projector for emitting the image light, and an infrared light projector for emitting the test light.

In accordance with the present disclosure, there is further provided a method for detecting an image artifact in images displayed to a user by a display device comprising first and second waveguides for conveying the images to left and right eyes of the user respectively. The method includes in-coupling test light carrying a first test image into the first waveguide, in-coupling test light carrying a second test image into the second waveguide, out-coupling the test light propagated in the first and second waveguides, and detecting the first and second test images carried by the test light. The first and second test images may then be compared to each other. Positions of reference features of the first and second test images may be compared to determine a binocular disparity of the display device. The images to be displayed to left and right eyes of the user may be shifted relative to one another to lessen the binocular disparity of the display device. In embodiments where the first and second test images each comprise a pre-defined distribution of at least one of luminance or color across a field of view of the display device, the method may further include determining at least one of luminance or color uniformity across the field of view of the display device based on the detected test images. At least one of luminance or color distribution of the images to be displayed to left and right eyes of the user may be pre-compensated to improve the at least one of luminance or color uniformity across the field of view of the display device.

The method steps may be repeated at regular time intervals, and/or performed in response to a triggering event, which may include e.g. a physical parameter of the display device exceeding a threshold, turning on the display device, and/or turning off the display device. The physical parameter may include e.g. acceleration, temperature variation, humidity variation, and/or ambient light level variation.

In some embodiments, the image light and the test light are provided in a time-sequential manner. In such embodiments, the image light carries first and second modified images such that, for each eye of the user, a sum of the respective modified image and the respective test image equals to an image to be displayed to the eye of the user. The detecting may be synchronized with providing the test light for detecting the first and second test images substantially independently on the images to be displayed to the eyes of the user. The detected test light may be spectrally analyzed.

Waveguide Tilt/Visual Disparity Sensors

Figure 1B:
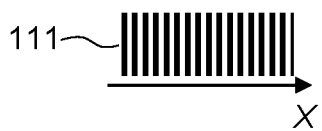
FIG. 1B is a view of exemplary test pattern and amplitude mask usable for determining the waveguide tilt.
Figure 1B:
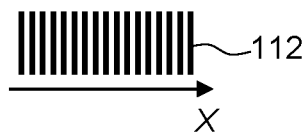

Referring now to FIGS. 1A and 1B, an apparatus 100 (FIG. 1A) for determining a tilt of a waveguide 102 includes a projector 104 providing test light 106 to the waveguide 102. The test light 106 carries a test pattern 111 (FIG. 1B). The projector 104 (FIG. 1A) may include a display panel 108 coupled to image forming optics 110. The projector 104 may also be of some other type, e.g. a scanning type projector providing an image in angular domain by scanning a collimated light beam. The projector 104 may be a dual function projector providing test patterns for tilt/disparity determination and displaying images to a user's eye 128. In some embodiments, the projector 104 may be dedicated to the apparatus 100 and configured solely for providing test patterns for waveguide tilt/binocular disparity determination. The test patterns may be made invisible to the user e.g. by providing them in invisible light such as near infrared (NIR) or ultraviolet (UV) light, disposing the test patterns outside of the display's field of view (FOV), etc.

A receiver 114 is configured to receive the test light 106 from the waveguide 102. The receiver 114 may include an amplitude mask 116 comprising a reference pattern 112 (FIG. 1B) corresponding to the test pattern 111. The receiver 114 (FIG. 1A) includes a photodetector assembly 120, which may be a single-pixel photodetector or a one-dimensional (1D) or two-dimensional (2D) array of photodetectors. The photodetector assembly 120 is disposed downstream of the amplitude mask 116 for generating a photodetector signal corresponding to an integrated irradiance of the test light 106 propagated through the amplitude mask 116. The receiver 114 may further include an objective or focusing element 124, such as a lens or a diffractive optical element, for example. The amplitude mask 116 may be disposed at the focal plane of the focusing element 124.

In the embodiment shown, the waveguide 102 is a pupil-replicating waveguide carrying the test light 106 by a series of total internal reflections (TIRs) from distal 121 and proximal 122 surfaces of the waveguide 102, as illustrated in FIG. 1A. The pupil-replicating waveguide may be a 2D pupil-replicating waveguide expanding the output pupil of the projector 104 in two dimensions, i.e. in XY plane. The waveguide 102 may include an in-coupler 125, e.g. a diffraction grating, for in-coupling the test light 106 from the image forming optics 110 of the projector 104 into the waveguide 102 at a first end of the waveguide 102. The waveguide 102 may further include at least one out-coupler 126, e.g. a diffraction grating, for out-coupling portions 107 of the test light 106 for observation of the displayed image by the user's eye 128, and an end out-coupler 126A for out-coupling at least a portion of the test light 106 at a second end of the pupil-replicating waveguide spaced apart from the first end, as shown in FIG. 1A. The end out-coupler 126A may be a part of the out-coupler 126. In some embodiments, the focusing element 124 may be combined with the end out-coupler 126A into a single integrated element.

In operation, the projector 104 forms the test pattern 111 in angular domain. To that end, the projector 104 may form the test pattern 111 in linear domain on the display panel 108, for example. The test light 106 emitted by the display panel 108 is collimated by the image forming optics 110 converting the test pattern 111 from linear domain into angular domain. The test light 106 propagates in the waveguide 102 to the end out-coupler 126A, which out-couples the test light 106 and directs the test light 106 to the focusing element 124 and the receiver 114. The focusing element 124 converts the test pattern 111 from angular domain back to linear domain, and superimposes the test pattern 111 with the reference pattern 112 on the amplitude mask 116. The superposition of the test pattern 111 and the reference pattern 112 results in a pattern having a certain magnitude of the overall integrated irradiance of the test light 106 propagated through the amplitude mask 116 and impinging onto the photodetector assembly 120. When the waveguide 102 is tilted relative to the projector 104, the test pattern 111 in angular domain shifts, because a constant angular offset is added to it. The shift of the test pattern 111 relative to the reference pattern 112 results in a change of overall transmitted optical power detected by the photodetector assembly 120, which changes the signal detected by the photodetector assembly 120.

The apparatus 100 may further include a controller 140 operably coupled to the projector 104 and the photodetector assembly 120. The controller 140 may be configured to cause the projector 104 to provide the test light 106 carrying the test pattern 111, receive a photodetector signal from the photodetector assembly 120 receiving the test light 106, and determine the tilt of the waveguide 102 from the signal detected by the photodetector assembly 120.

The waveguide 102 tilt may be determined from magnitude of the photodetector signal for a single-pixel photodetector, or from a comparison of signals from different pixels/photodetector elements of a multi-pixel detector assembly or a detector array. In some embodiments, the test pattern 111 includes a first periodic pattern having a first period $P_1$ at the focal plane of the focusing element 124, and the reference pattern 112 includes a second periodic pattern having a second period $P_2$. The first $P_1$ and second $P_2$ periods may be the same, or may differs from one another, e.g. the first period $P_1$ may differ from the second period $P_2$ by less than 25% of the first period $P_1$.

The controller 140 may be configured to shift the test pattern 111 laterally between a plurality of positions, and detect a signal from the photodetector assembly 120 at each position of the plurality of positions of the test pattern 111. An illustrative process may be described as follows. The controller 140 obtains a first photodetector signal after causing the projector 104 to emit the test light 106 carrying the test pattern 111 at an initial position of the test pattern 111. Then, the controller 140 shifts the test pattern, causes the projector to provide the test light carrying the shifted test pattern, and receives a second photodetector signal from the photodetector. The tilt of the waveguide is then determined by comparing the first and second photodetector signals. The process may be repeated to include more shifted positions.

Figure 2:
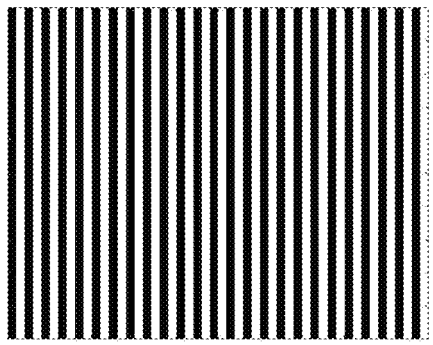
FIG. 2 shows an irradiance distribution of test light carrying a periodic line test pattern propagated through an amplitude mask having a same spatial period of lines and shifted by (a) 0, (b) ¼ period, (c) ½ period, (d) ¾ period, and (e) 1 spatial period.
Figure 2:
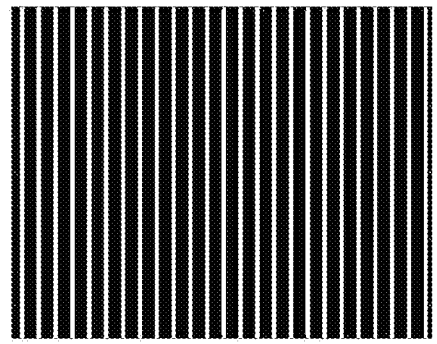
Figure 2:
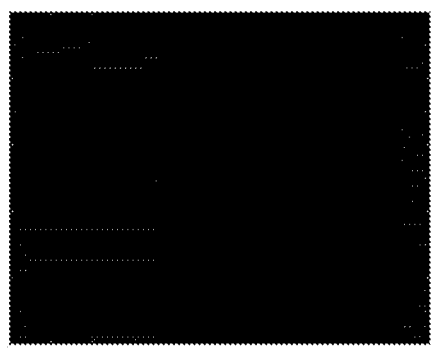
Figure 2:
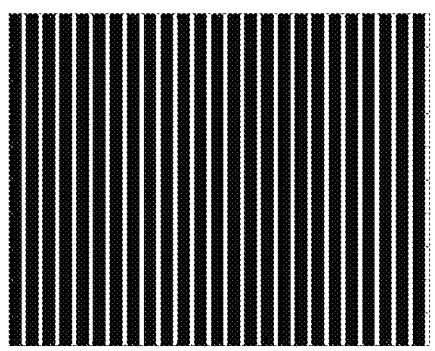
Figure 2:
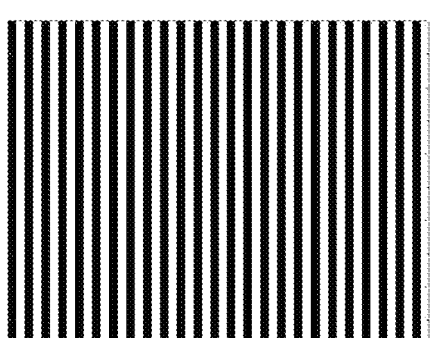
Figure 3A:
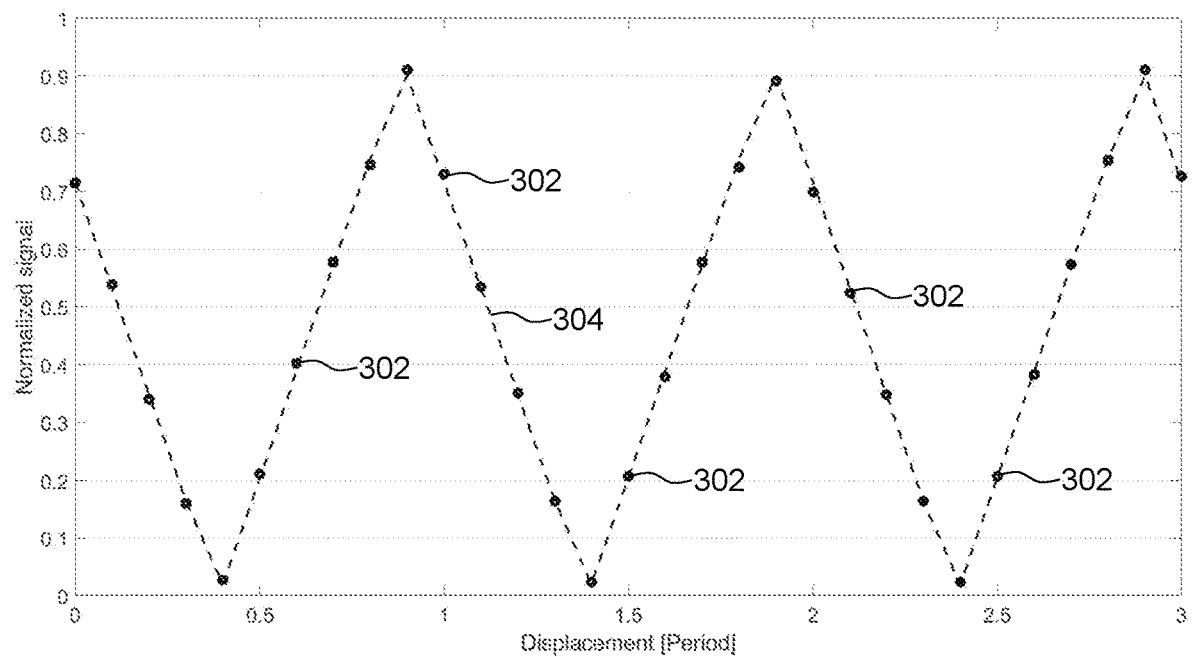
FIG. 3A is a plot of normalized integrated irradiance at different values of displacement between the reference pattern and amplitude mask, circles representing a predicted signal+added noise, dashed line representing a fit of the predicted signal.

For example, referring to FIG. 2, the test patterns may be line patterns of a same spatial period or pitch. At an initial position of the test pattern, the test and reference patterns coincide i.e. are not shifted relative to each other, and the photodetector receives the optical power density distribution shown at (a). The photodetector will detect an optical signal proportional to the white area of the resulting bar pattern. When the reference position is shifted by ¼ of a full period as shown at (b), the optical signal decreases accordingly, but is still not zero. When the reference position is shifted by ½ of a full period as shown at (c), the optical signal is zero. At a subsequent shift to a total of ¾ of the full spatial period (d), the optical signal increases to the level of (b). Finally, at the shift of one period as shown at (e), the optical signal increases to the original level. The resulting test signal waveform is illustrated in FIG. 3A, where black circles 302 represent a predicted signal with an simulated added noise, and sawtooth-shaped dashed line 304 represents a fit of the predicted detector signal.

Figure 3B:
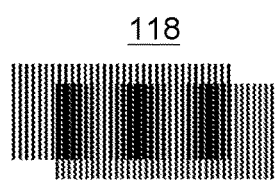
FIG. 3B is a plot of a Moire pattern between reference and amplitude mask line patterns having slightly different periods.

FIG. 3B illustrates a case where the spatial periods of the test and reference patterns are slightly different, such that their superposition results in the formation of a Moire pattern 118 including spatially varying periods of integrated optical power density or irradiance. For such an embodiment, the photodetector assembly may include a plurality of photodetector elements disposed for detecting integrated irradiance values from different portions of the Moire pattern 118 of the test light 106 propagated through the amplitude mask 116. The controller 140 may determine a tilt of the waveguide 102 from the photodetector assembly 120 signal at the plurality of positions of the test pattern 111, for example, from the phase of the periodically varying detector signals of a multi-detector assembly. In some embodiments, the reference pattern 112 may include a plurality of periodic bar patterns, and the photodetector assembly 120 may include a plurality of detector pixels or a plurality of individual photodetectors, each detector pixel or individual photodetector being disposed downstream of a corresponding periodic bar pattern of the plurality of periodic bar patterns. Examples of such embodiments will be considered further below.

The projector 104 may be a multi-color projector, e.g. an RGB (red, green, and blue) projector forming an RGB image in angular domain including R, G, and B color channels, i.e. image components in red, green, and blue light respectively. In some embodiments, the display panel 108 may display the R, G, and B color channels simultaneously, by providing an RGB image. The projector 104 may also display the R, G, and B color channels in sequence, switching between channels fast enough for the eye to integrate the R, G, and B frames into a single color image. The controller 140 may generate a test frame comprising a test pattern in at least one of the R, G, and B color channels, and determine an image offset in the at least one of the R, G, and B color channels from the photodetector signal(s). For example, the controller 140 may generate the test pattern in each of the R, G, and B color channels sequentially, and determine the offset between the R, G, and B color channels for future compensation of the color disparity, in addition to, or instead of determining visual disparity between images displayed for left and right eyes of a user. The test patterns may be displayed for a short enough time not to be immediately noticeable by the user, or they may be displayed outside of the field of view of the display, enabling a waveguide tilt to be determined in real time, for adequate correction of tilt by shifting the image to be displayed to offset the waveguide 102 tilt. In embodiments where the projector 104 is dedicated to tilt/disparity sensing, the projector 104 may be configured for operation in a spectral band invisible to a human eye, e.g. a near infrared band between 800 nm and 1100 nm, and the photodetector assembly 120 may be configured to detect light in the spectral band.

Figure 4A:
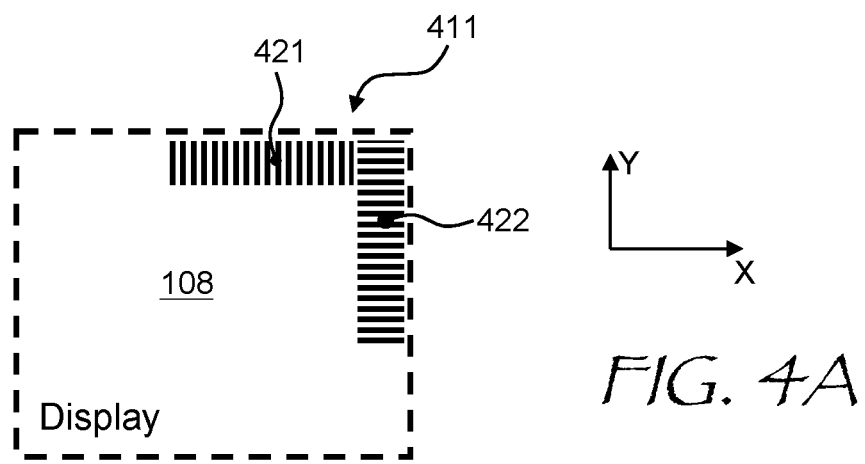
FIG. 4A is a plan view of a displayed test frame showing horizontal and vertical reference line patterns, according to an embodiment.

FIG. 4A illustrates another example of usable test patterns. A test pattern 411 may include first 421 and second 422 bar patterns, with individual bars of one pattern substantially perpendicular to individual bars of the other pattern. Throughout this specification, the term "substantially" when applied to an angular value means within +/−10 degrees of a nominal value, e.g. "substantially perpendicular" means from 80 degrees to 100 degrees between the X- and Y-axes. Specifically in the example of FIG. 4A, the first bar pattern 421 extends horizontally, i.e. in X-direction, and includes vertical bars extending in Y-direction. Accordingly, the second bar pattern 422 extends vertically, i.e. in Y-direction, and includes horizontal bars extending in X-direction.

Figure 4B:
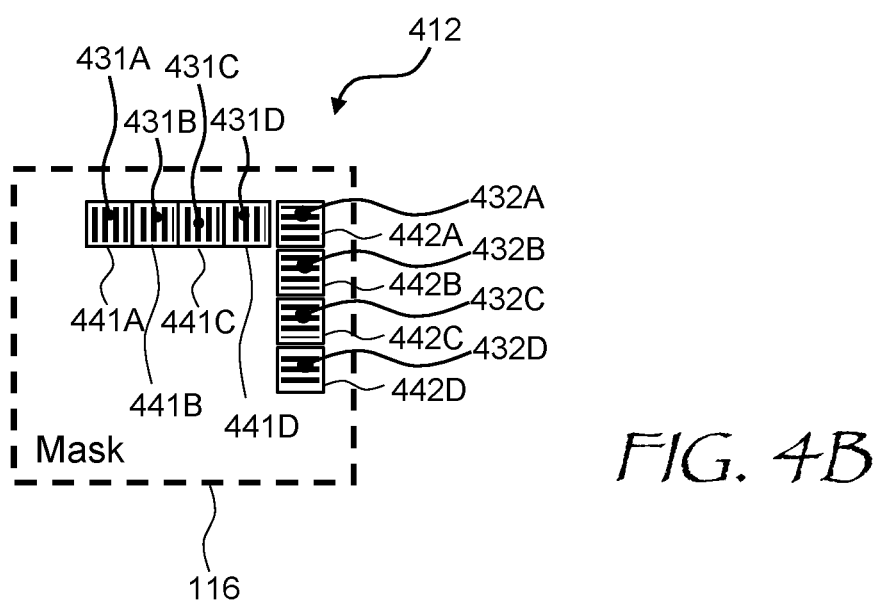
FIG. 4B is a plan view of receiver amplitude mask patterns including horizontal and vertical periodic bar patterns having different spatial phases, according to an embodiment.

Referring to FIG. 4B, a corresponding reference pattern 412 may include a plurality of periodic bar patterns, for example a horizontal array of vertical bar patterns 431A, 431B, 431C, and 431D corresponding to the first bar pattern 421 of the test pattern 411, and a vertical array of horizontal bar patterns 432A, 432B, 432C, and 432D corresponding to the second bar pattern 422 of the test pattern 411. The photodetector assembly may include a plurality of individual detectors or detector pixels downstream of a corresponding bar pattern. In this example, the photodetector assembly includes a horizontal array of photodetectors 441A, 441B, 441C, and 441D disposed downstream of the horizontal array of vertical bar patterns 431A, 431B, 431C, and 431D, respectively; and a vertical array of photodetectors 442A, 442B, 442C, and 442D disposed downstream of the vertical array of horizontal bar patterns 432A, 432B, 432C, and 432D. Each periodic bar pattern of the plurality of periodic bar patterns may have a same pitch and a different spatial phase or spatial offset. In other words, the vertical bar patterns 431A, 431B, 431C, and 431D may be shifted in phase relative to one another; and horizontal bar patterns 432A, 432B, 432C, and 432D may be shifted in phase relative to one another. This enables one to do away with shifting the first 421 and second 422 bar patterns of the test pattern 411 during measurements, and instead compare signals from the corresponding photodetectors of the vertical array to measure tilt of the waveguide about X-axis; and/or compare signals from the corresponding photodetectors of the horizontal array to measure tilt of the waveguide about Y-axis, making a faster overall measurement.

Figure 5:
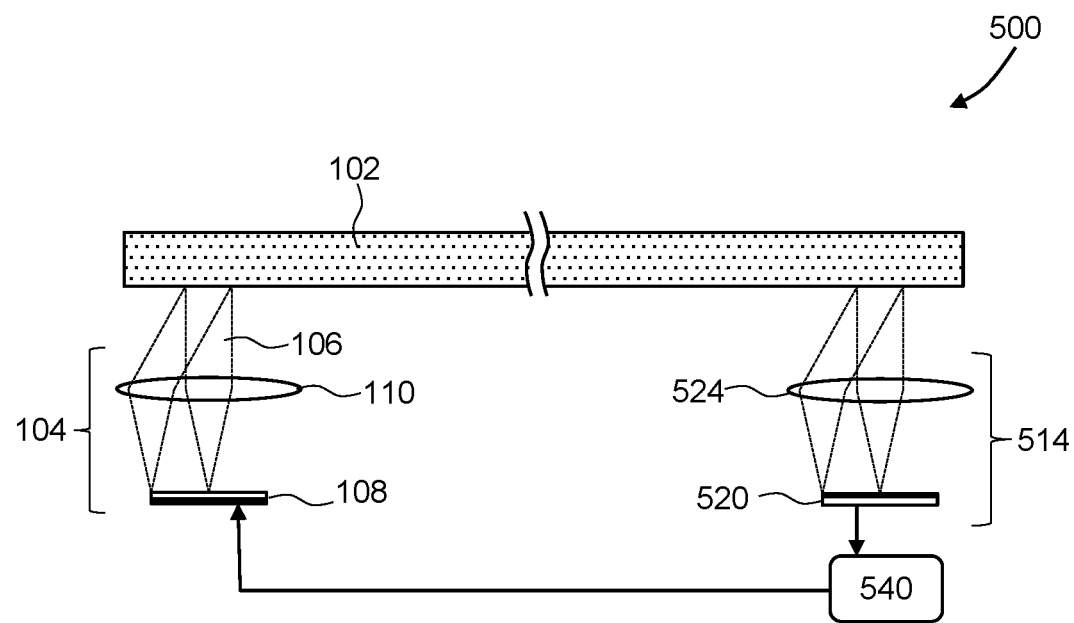
FIG. 5 is a schematic diagram of an embodiment of a waveguide tilt/binocular disparity sensor based on a photodetector array instead of an assembly including an amplitude mask and a single-pixel detector.

Turning to FIG. 5, an apparatus 500 for determining waveguide tilt is similar to the apparatus 100 of FIG. 1A. The apparatus 500 of FIG. 5 includes a detection unit or receiver 514 for receiving the test light 106 from the waveguide 102 carrying a reference image in angular domain. The receiver 514 includes a focusing element 524, e.g. a lens, a diffractive element, or a combination of the two, for converting the reference image from angular to linear domain at a focal plane of the focusing element 524. The receiver 514 further includes a photodetector array 520 disposed in a focal plane downstream of the focusing element 524 for obtaining the reference image, and a controller 540 operably coupled to the photodetector array 520 and the display panel 108. The controller 540 may be configured, e.g. programmed, to cause the display panel 108 to generate the test light 106 carrying the first reference image, obtain the signal from the photodetector array 520, and determine the tilt of the waveguide 102 from a position of the reference image obtained by the photodetector array 520.

In embodiments where the reference image includes a periodic pattern, e.g. the test pattern 111 of FIG. 1B, the controller 540 (FIG. 5) may be configured to determine the position of the reference image by computing a convolution integral of the periodic pattern image obtained by the photodetector 520, and a periodic function such as, for example, the reference pattern 112 of FIG. 1B. The periodic function may have the same period as the test pattern 111, a different period, a spatially varying period, etc. The periodic pattern used for computation the convolution integral operates as a digital "amplitude mask", achieving the same function as the actual amplitude mask, but digitally. In some embodiments, a plurality of convolutions may be computed at different positions of the periodic function, at different shifts of the test pattern, etc. All embodiments with a physical amplitude masks may be represented by a corresponding digital amplitude mask.

Figure 6:
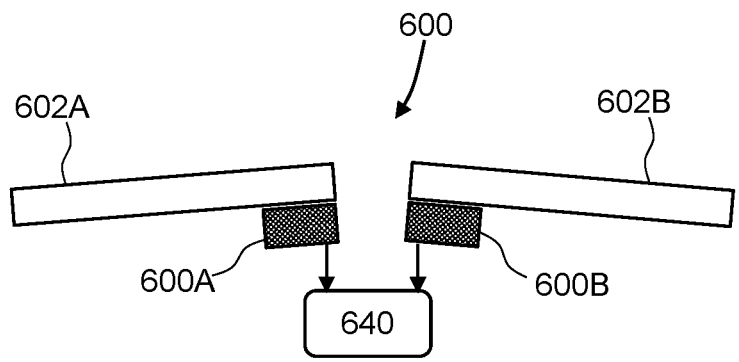
FIG. 6 is a schematic diagram of a binocular disparity sensor based on a pair of waveguide tilt sensors disclosed herein.

A pair of apparatuses for determining waveguide tilt disclosed herein may be used to determine binocular disparity between images conveyed by left and right waveguides of a display. Referring to FIG. 6 for example, an apparatus 600 for determining binocular disparity in a display including first 602A and second 602B waveguides includes first 600A and second 600B tilt sensors of the first 602A and second 602B waveguides respectively. The first 600A and second 600B tilt sensors may include the apparatus 100 of FIG. 1A and/or the apparatus 500 of FIG. 5, or any other waveguide tilt sensor disclosed herein. The apparatus 600 of FIG. 6 further includes a controller 640 configured to determine each waveguide tilt and compute binocular disparity from the determined waveguide tilts.

Figure 7A:
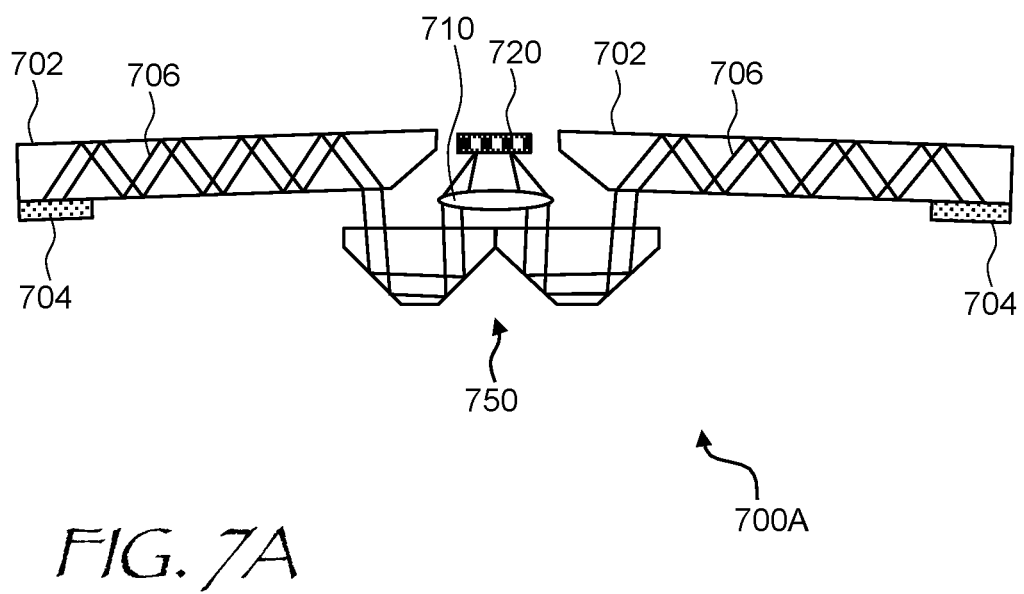
FIG. 7A is a schematic top view of an apparatus for detecting binocular disparity and other image defects in a near-eye display based on a photodetector array.

The pair of tilt sensors 600A, 600B may be combined into a single binocular disparity sensor device. Elements such as lenses, photodetectors, etc., may be shared to provide cost savings and increase overall precision of binocular disparity measurement. Referring to FIG. 7A, an apparatus 700A may be used to determine binocular disparity in any display device conveying images to eyes of a user by dedicated left and right waveguides or waveguide assemblies. The apparatus 700A includes projectors 704 coupled to opposed outer ends of waveguides 702 for emitting test light 706 carrying respective test pattern in angular domain. Light 706 emitted by the projectors 704 propagates through the waveguides 702 and is coupled by a prism assembly 750 to a focusing element 710, such as refractive and/or a diffractive lens, which focuses the light 706 onto a pixelated photodetector 720, converting the references patterns from angular to linear domain. The prism assembly 750 may include a pair of prismatic elements disposed proximate one another, as shown. In this configuration, the relative position of the test patterns, which may include complex arrayed patterns ore be as simple as light spots focused on the pixelated photodetector 720, indicates a tilt angle of one waveguide 702 relative to the other waveguide 702. When a relative tilt is detected, the visual images generated by the left and right display projectors for observation by a user may be digitally adjusted to compensate. For example, the visual images may be shifted in direction(s) compensating visual disparity resulting from the relative tilt of the waveguides carrying the images to the left and right eyes. The projectors 704 may be dedicated projectors, which may operate at an invisible wavelength, or, in some embodiments, the projectors 704 may be the same display projectors that convey images for observation by the user.

Figure 7B:
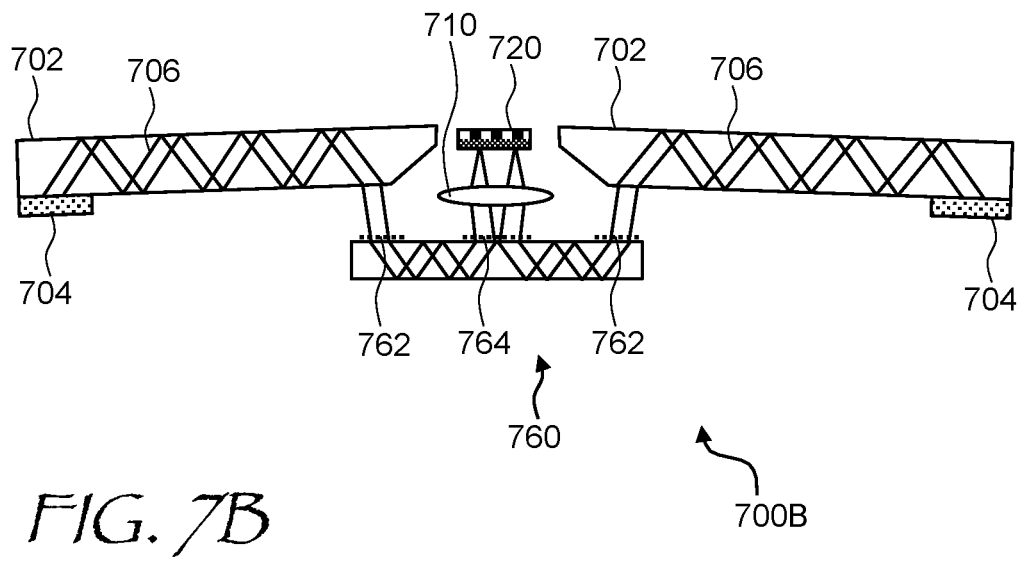
FIG. 7B is a schematic top view of a variant of the apparatus of FIG. 7A using a 1D waveguide to bring the out-coupled test light from both left and right pupil-replicating waveguides to a common photodetector array.

Turning to FIG. 7B, a binocular disparity sensing apparatus 700B is similar to the binocular disparity sensing apparatus 700A of FIG. 7A. The binocular disparity sensing apparatus 700B includes a waveguide 760 in place of the prism assembly 750 of the apparatus 700A. The waveguide 760 (FIG. 7B) may be configured to carry the light 706 by a series of total internal reflections (TIRs) from its two opposed surfaces. A pair of in-coupling gratings 762 disposed at outer sides of the waveguide 760 may be provided for in-coupling the light 706 from the waveguides 702, the light 706 from the left and right waveguide 702 propagating towards each other. The waveguide 760 may include an out-coupling grating 764 disposed at the middle of the waveguide 760, for out-coupling the light 706 at angles corresponding to in-coupling angles. Thus, the waveguide 760 performs a similar function as the prism assembly 750 of the apparatus 700A of FIG. 7A. The waveguide 760 is termed "one-dimensional" (1D) waveguide, since it propagates the in-coupled light in one direction only, which is different from the waveguides 702, which typically are "two-dimensional" (2D) waveguides that spread the in-coupled test light in two directions. The geometry of the light spreading and/or propagation in the waveguide is determined by the configuration of the grating in-couplers and out-couplers.

In certain embodiments of the apparatuses 700A of FIG. 7A and 700B of FIG. 7B, a pair of amplitude masks (or a combined mask) coupled to individual photodetectors downstream of the respective amplitude masks may be used instead of the pixelated photodetector 720. The amplitude mask(s) may have reference pattern(s) corresponding to test patterns carried by the test light 706 in the waveguides 702. The photodetectors may be disposed and configured for generating photodetector signals corresponding to an integrated irradiance of the test light 706 propagated through the respective amplitude mask(s).

Figure 8:
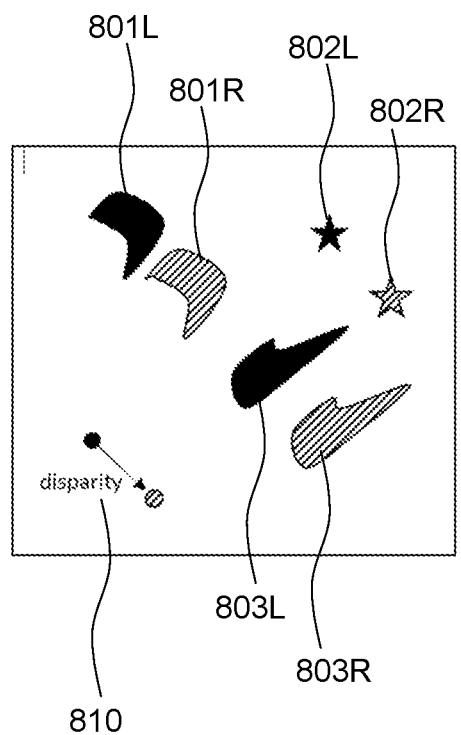
FIG. 8 is an example of various test/reference patterns usable in the tilt/disparity sensors disclosed herein.

Referring to FIG. 8, example test patterns to be used in determining the binocular disparity may include, for example, shapes 801L, 802L, 803L for left (L) waveguides and corresponding shapes 801R, 802R, 803R for right (R) waveguides. Any suitable shapes may be used, including without limitation, a dot, a bar, a polygon, a chevron, an oval, etc., to sense the binocular disparity illustrated at 810.

Figure 9A:
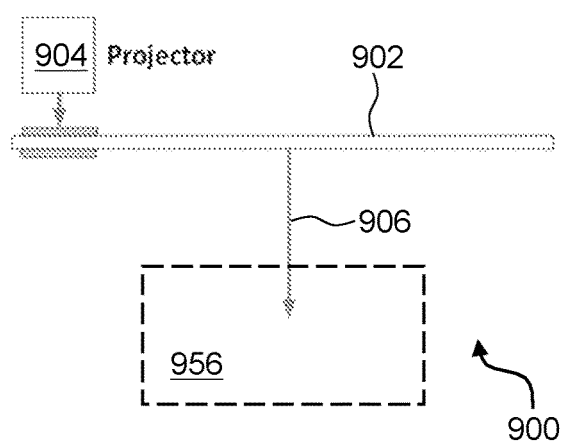
FIGS. 9A and 9B are schematic partial views of a near-eye display having projector and eyebox on opposite sides of a waveguide.
Figure 9B:
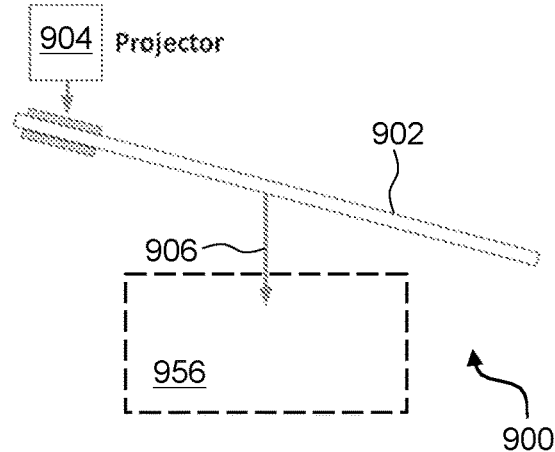

The effect of tilt on waveguides on visual disparity is illustrated in FIGS. 9A-9B and 10A-10B. Referring first to FIGS. 9A and 9B, a near-eye display 900 includes a projector 904 and eyebox 956 on opposite sides of a waveguide 902. In other words, the projector 904 is front-mounted, extending outside of the near-eye display 900 and away from the user. Herein, the term "eyebox" is defined as a geometrical area, e.g. 2D or 3D area, where an AR image of an acceptable quality may be formed for viewing by the wearer of the AR display.

FIG. 9A depicts the waveguide 902 at a nominal orientation. Image light 906 emitted by the projector 904 exits the waveguide 902 at a nominal angle, i.e. straight down to the eyebox 956. FIG. 9B shows the waveguide 902 at a tilted orientation. The tilting may result, for example, from a bending or flexing of a frame, not shown, of the near-eye display 900. Despite the tilting, the image light 906 exits the waveguide 902 at approximately the nominal angle. This is similar to a situation where the image light 906 is transmitted through the waveguide 902, as if the waveguide 902 were a mere plate of glass.

Figure 10A:
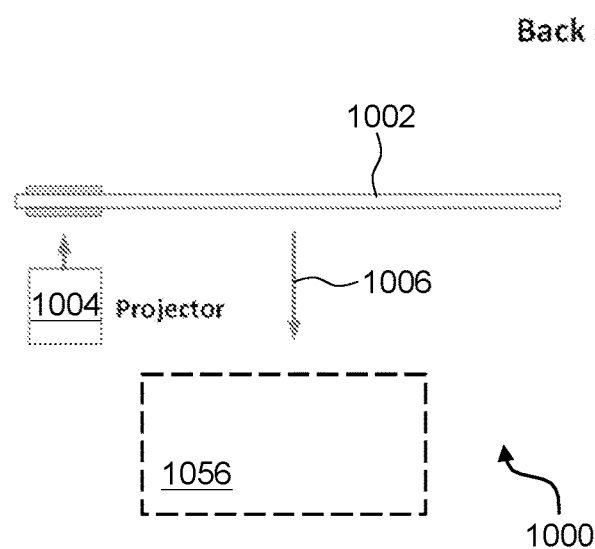
FIGS. 10A and 10B are schematic partial views of a near-eye display having projector and eyebox on the same side of the waveguide.
Figure 10B:
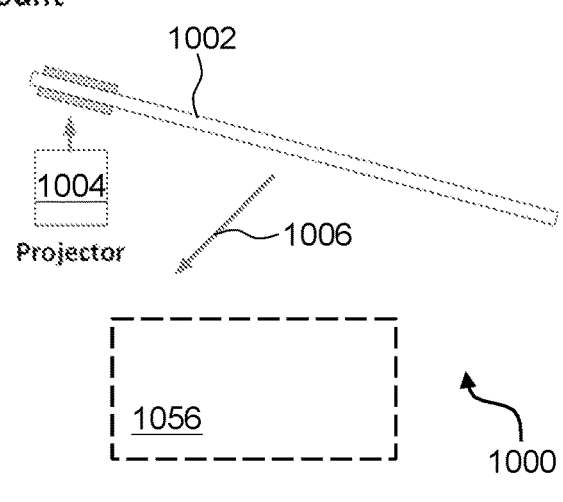

Turning to FIGS. 10A and 10B, a near-eye display 1000 has a projector 1004 and eyebox 1056 on a same side of a waveguide 1002. In other words, the projector 1004 is back-mounted, extending towards the user. FIG. 10A depicts the waveguide 1002 at a nominal orientation. Image light 1006 emitted by the projector 1004 exits the waveguide 1002 at a nominal angle, i.e. straight down to the eyebox 1056. FIG. 10B shows the waveguide 1002 at a tilted orientation. The tilting may result, for example, from a bending or flexing of a frame, not shown, of the near-eye display 1000. Due to the tilting, the image light 1006 exits the waveguide 1002 at a "wrong" angle, approximately twice the angle of tilt of the waveguide 1002. This is similar to a situation where the image light 1006 is reflected from the waveguide 1002, as if the waveguide 1002 were a mirror.

The image light 1006 carries the image in angular domain, therefore any angular offsets will results in the apparent shift of the image observed by the user's eye placed at the eyebox 1056, causing binocular disparity between left and right displayed images. Apparatuses for determining angular offsets of the waveguide disclosed herein may be used to detect and measure the angular offset, or tilt, of the waveguide, enabling the compensation of the tilt by properly shifting the image(s) to be displayed. The compensation of the binocular disparity afforded by the devices described herein enable the placement of the projectors on the inside of the display as shown in FIGS. 10A and 10B, thereby reducing the display's overall size and making the display look more like a pair of regular glasses.

In accordance with the above disclosure, the following embodiments of binocular disparity sensing devices are provided:

Embodiment 1. An apparatus for detecting a tilt of a waveguide, the apparatus comprising:
a projector for coupling test light into the waveguide, the test light carrying a test pattern; and
a receiver for receiving the test light from the waveguide, the receiver comprising:
an amplitude mask comprising a reference pattern corresponding to the test pattern; and
a photodetector assembly downstream of the amplitude mask for generating a photodetector signal corresponding to an integrated irradiance of the test light propagated through the amplitude mask.

Embodiment 2. The apparatus of Embodiment 1, wherein the test pattern comprises a first periodic pattern, the reference pattern comprises a second periodic pattern, wherein a first period of the first periodic pattern differs from the a second period of the second periodic pattern by less than 25% of the first period.

Embodiment 3. The apparatus of Embodiment 2, wherein the first and second periods are different from each other, and wherein the photodetector assembly comprises a plurality of photodetector elements disposed for detecting integrated irradiance values from different portions of a Moire pattern of the test light propagated through the amplitude mask.

Embodiment 4. The apparatus of Embodiment 1, wherein the reference and reference patterns each comprise at least one of: a dot, a bar, a polygon, a chevron, or an oval.

Embodiment 5. The apparatus of Embodiment 1, wherein:
the waveguide comprises a pupil-replicating waveguide;
the test light is provided by the projector at a first end of the pupil-replicating waveguide; and
the test light is received by the receiver at a second end of the pupil-replicating waveguide spaced apart from the first end.

Embodiment 6. The apparatus of Embodiment 5, wherein the test light provided by the projector carries the test pattern in angular domain, the receiver further comprising a focusing element for converting the test pattern from angular domain to linear domain, wherein the amplitude mask is disposed at a focal plane of the focusing element.

Embodiment 7. The apparatus of Embodiment 5, further comprising a controller operably coupled to the projector and the photodetector assembly and configured to:
cause the projector to provide the test light carrying the test pattern;
receive a first photodetector signal from the photodetector assembly receiving the test light; and
determine the waveguide tilt from the received first photodetector signal.

Embodiment 8. The apparatus of Embodiment 7, wherein the projector is an RGB projector for providing an RGB image in angular domain comprising at least one of a red color channel, a green color channel, or a blue color channel, and wherein the controller is configured to:
generate a test frame comprising the test pattern in at least one of the red, green, and blue color channels; and
determine the waveguide tilt in the at least one of the red, green, and blue color channels from the received photodetector signal.

Embodiment 9. The apparatus of Embodiment 7, wherein the projector is configured for operation in a spectral band invisible to a human eye, and wherein the photodetector assembly is configured to detect light in the spectral band.

Embodiment 10. The apparatus of Embodiment 7, wherein the controller is further configured to:
shift the test pattern to obtain a first shifted pattern;
cause the projector to provide the test light carrying the first shifted pattern;
receive a second photodetector signal from the photodetector assembly receiving the test light carrying the first shifted pattern; and
determine the tilt of the waveguide from the received first and second photodetector signals.

Embodiment 11. The apparatus of Embodiment 7, wherein:
the test pattern comprises an array of first features;
the reference pattern comprises an array of second features corresponding to the first features and disposed with different offsets relative to the corresponding first features of the test pattern;
the photodetector assembly comprises an array of photodetector elements disposed for detecting different portions of the test light carrying different first features and propagated through corresponding second features of the amplitude mask; and
the controller is further configured to determine the tilt of the waveguide from photodetector signals of the array of photodetector elements.

Embodiment 12. An apparatus for determining visual disparity between images conveyed by left and right pupil-replicating waveguides of a display, the apparatus comprising:
first and second receivers for receiving test light from the left and right pupil-replicating waveguides, respectively, of the display, the first and second receivers each comprising:
an amplitude mask comprising a reference pattern corresponding to a test pattern carried by the test light in the pupil-replicating waveguide; and
a photodetector downstream of the amplitude mask for generating a photodetector signal corresponding to an integrated irradiance of the test light propagated through the amplitude mask; and
a controller operably coupled to the photodetectors of the first and second receivers and configured to:
cause the display to generate reference patterns to be conveyed by test light propagating in the first and second pupil-replicating waveguides; and
determine the visual disparity by comparing signals of the photodetectors.

Embodiment 13. The apparatus of Embodiment 12, wherein the first and second receivers each comprise a focusing element for converting the corresponding test pattern from angular domain to linear domain, wherein the amplitude mask of the each one of the first and second receivers is disposed at a focal plane of the corresponding focusing element.

Embodiment 14. An apparatus for determining visual disparity between images conveyed by first and second waveguides of a display, the apparatus comprising:
a receiver for receiving test light from the first waveguide, the test light carrying a first reference image in angular domain, the receiver comprising:
a focusing element for converting the first reference image from angular to linear domain; and
a photodetector array in a focal plane downstream of the focusing element for obtaining the first reference image; and
a controller operably coupled to the photodetector array and configured to:
cause the display to generate the test light carrying the first reference image; and
determine the visual disparity from a position of the first reference image obtained by the photodetector array.

Embodiment 15. The apparatus of Embodiment 14, wherein the first reference image comprises a periodic pattern, and wherein the controller is configured to determine the position of the first reference image by computing a convolution of the periodic pattern obtained by the photodetector with a periodic function.

Embodiment 16. The apparatus of Embodiment 14, wherein the first and second projectors each emit the test light in a wavelength band invisible to a human eye.

Embodiment 17. The apparatus of Embodiment 14, wherein:
the receiver is configured for receiving test light from the second waveguide, the test light carrying a second reference image in angular domain;

the focusing element is configured for converting the second reference image from angular to linear domain; and the photodetector array is configured for obtaining the second reference image; and the controller is configured to cause the display to generate the test light carrying the second reference image and to determine the visual disparity from a relative position of the first and second reference images on the photodetector array.

Embodiment 18. The apparatus of Embodiment 14, further comprising a pair of prisms for receiving the test light from the first and second pupil-replicating waveguides, and for coupling the received test light to the focusing element.

Embodiment 19. The apparatus of Embodiment 14, further comprising a waveguide and a grating out-coupler supported thereby for directing the test light out-coupled by the first and second pupil-replicating waveguides towards the focusing element.

Embodiment 20. The apparatus of Embodiment claim 19, wherein the focusing element comprises at least one of a refractive or diffractive lens.

Self-Testing Displays

Figure 11:
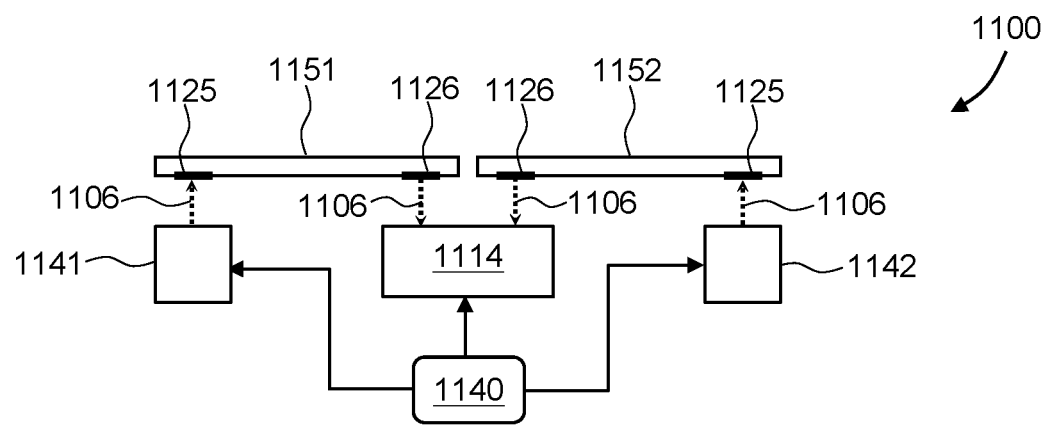
FIG. 11 is a schematic top view of a self-testing display device of this disclosure.

Referring to FIG. 11 with further reference to FIG. 1A, a display device 1100 includes first 1141 and second 1142 projection units such as, for example, the projector 104 of the apparatus 100 of FIG. 1A. The projection units 1141, 1142 provide test light 1106 (FIG. 11) carrying first and second test images, respectively. The test light 1106 may be in a visible wavelength range, e.g. in a wavelength range between 380 nm and 700 nm, or in some embodiments, the test light 1106 may be in an invisible wavelength range, such as ultraviolet (UV) or near infrared (NIR). By way of a non-limiting example, the NIR test light 1106 may be in a wavelength range between 700 nm and 1100 nm.

First 1151 and second 1152 waveguides propagate image light carrying images to be displayed to left and right eyes of a user respectively, similarly to the waveguide 102 of FIG. 1A. Each one of the first 1151 and second 1152 waveguides of FIG. 11 includes an in-coupling area 1125 for in-coupling the test light 1106 from the respective projection unit 1141, 1142. Each one of the first 1151 and second 1152 waveguides further includes an out-coupling area 1126 for extracting the test light 1106 from the waveguides 1151, 1152.

A detection unit 1114 is provided for receiving the test light out-coupled from the first and second waveguides, and for detecting the test images generated by the projection units 1141, 1142 and propagated through the waveguides 1151, 1152, respectively. In embodiments where the display device 1100 is a headset to be worn on a head of the user, the first 1141 and second 1142 projection units may be located in a temporal region of the headset, and the detection unit 1114 may be located in a nasal region of the headset. In other words, the first 1141 and second 1142 projection units may be located one the sides of the headset, and the detection unit 1114 may be located near or at the center of the headset.

A controller 1140 may be operably coupled to the detection unit 1114. The controller 1140 may be suitably located e.g. at the center or at a side area of the display device 1100. The controller 1140 may cause the first 1141 and second 1142 projection units to display a reference feature having a pre-defined position and/or orientation. The controller 1140 may be configured to determine visual disparity between images displayed to left and right eyes of the user by comparing the positions/orientations of the reference features in the test images detected by the detection unit 1114, as has been explained above with reference to FIGS. 1A-1C, 4A-4B, and FIG. 8. In some embodiments, the controller 1140 may be configured to cause the first 1141 and second 1142 projection units to display an image with a known distribution of at least one of luminance or color across a field of view of the display device 1100, or even a flat field of a pre-defined color and/or luminance. The controller 1140 may then determine luminance, color uniformity, or both, across the field of view of the display device 1100 based on the test images detected by the detection unit 1114. Other reference patterns may be used to determine other types of image imperfections, including without limitation optical aberrations, image distortions, pupil swim, etc.

Figure 12A:
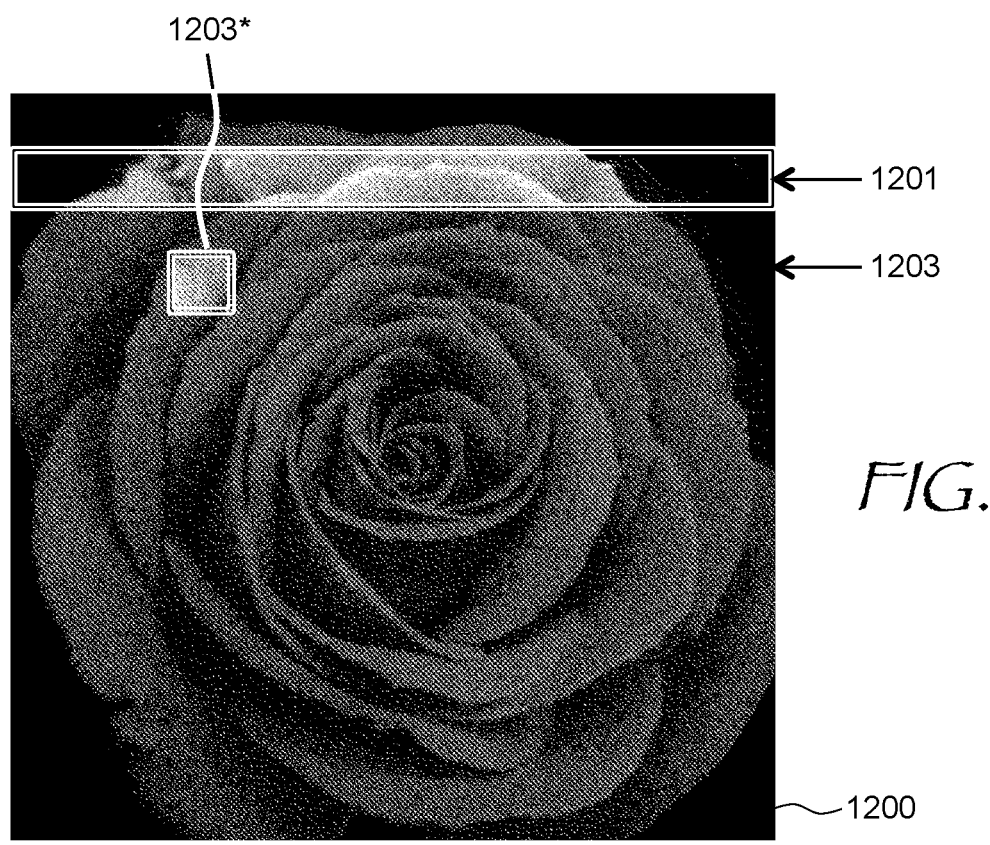
FIGS. 12A to 12D are views of an image frame displayed with image light and test light in a time-sequential manner.
Figure 12B:
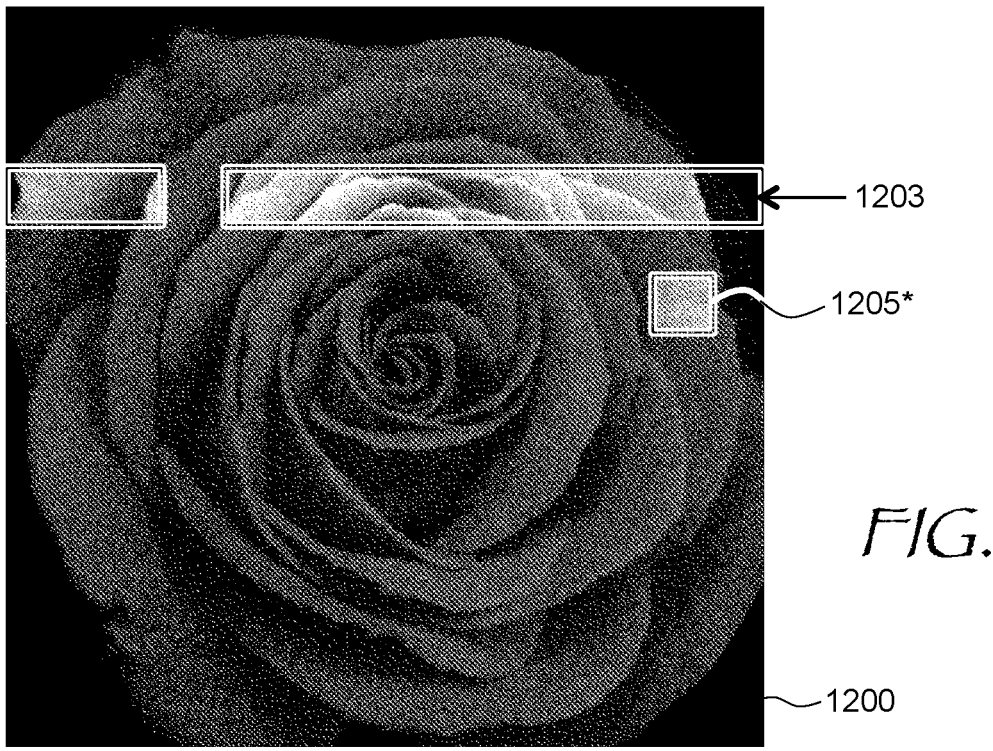
Figure 12C:
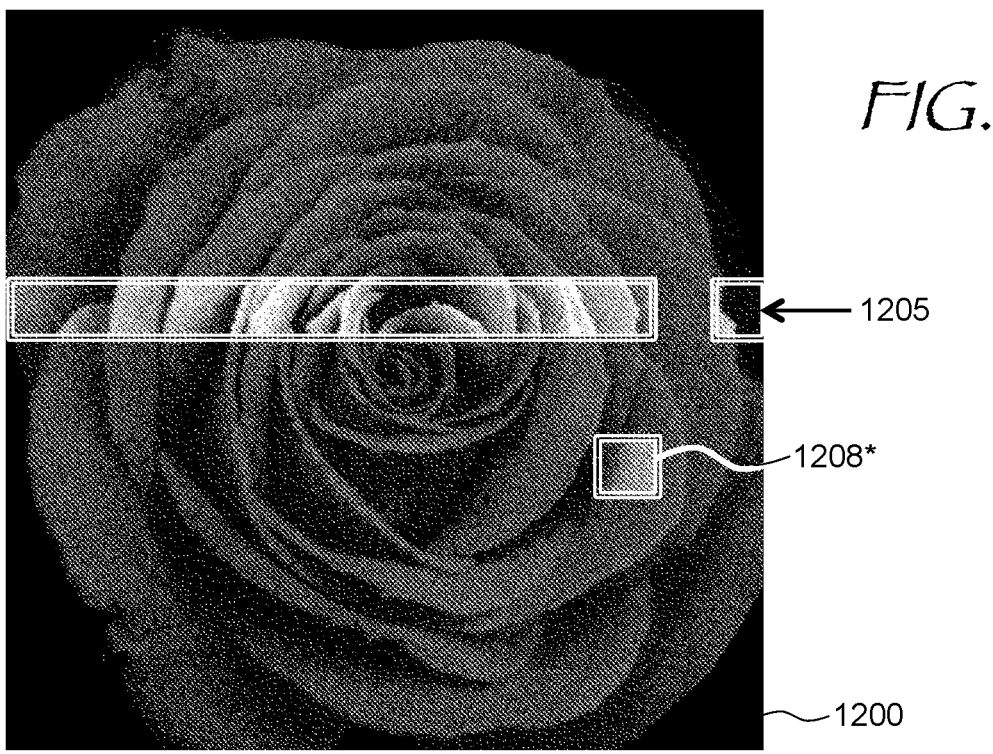
Figure 12D:
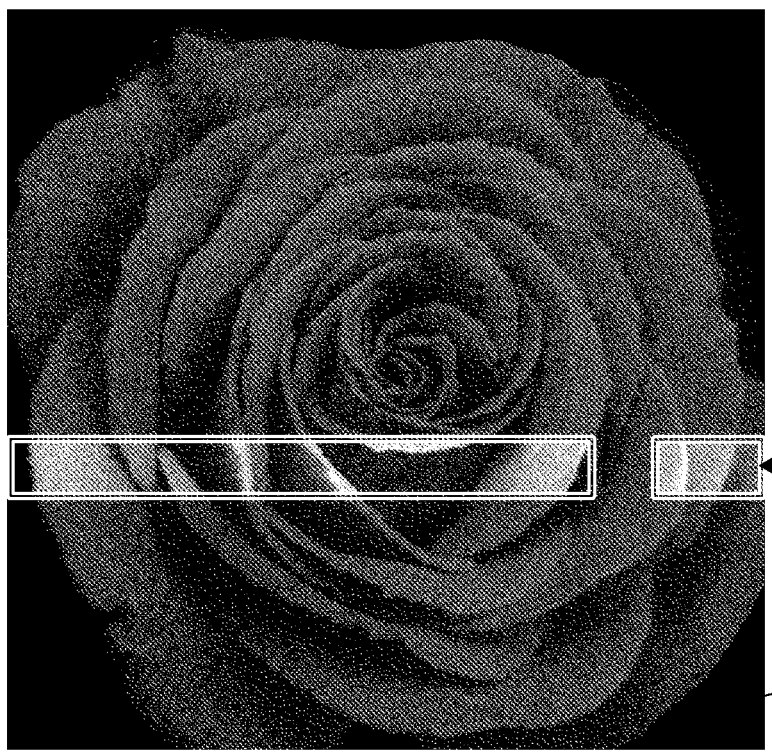

In embodiments where the test light and image light share a same wavelength band, e.g. the visible wavelength range between 380 nm and 700 nm, the controller 1140 may be configured to cause the first 1141 and second 1142 projection units to provide the image light (not shown) and the test light 1106 in a time-sequential manner. By way of a non-limiting example, referring to FIGS. 12A to 12D, an image 1200 is displayed to the user by a 2D display line-by-line or portion-by-portion. In FIG. 12A, a first line 1201 is displayed simultaneously with a portion 1203* of a third line 1203. The detection unit 1114 is configured to detect the portion 1203* of a third line 1203 at the time the first line 1201 of the image 1200 is being displayed. At a subsequent interval of time, subsequent lines of the image 1200 are displayed, with the previously displayed image portions subtracted. For example, by the time the third line 1203 of the image 1200 is displayed (FIG. 12B), the portion 1203* is subtracted from the displayed line as illustrated in FIG. 12B, but the human eye will time-integrate such that the entire line of image is displayed. Further, by the time the third line 1203 of the image 1200 is displayed, a portion 1205* of a fifth line 1205 of image may be displayed (FIGS. 12B, 12C) for detection by the detection unit 1114 (FIG. 11).

The displaying of the image 1200 may be continued line-by-line. Still referring to FIG. 12C, the fifth line of image 1200 is displayed without the corresponding portion 1205* displayed previously (FIG. 12B), but with a portion 1208* of the $8^{th}$ line 1208 (FIG. 12D) to be displayed. That portion is omitted when displaying the $8^{th}$ line, and so on. It is noted that the portions 1203*, 1205*, 1208*, etc., do not need to be true portions of an actual image. They may be some other test images, e.g. a patterns of features for visual disparity determination as explained above with reference to FIGS. 2, 3A-3B, and 4A-4B for example, a constant level of color/luminosity for uniformity measurements, etc. Those test images/patterns, however, would need to be subtracted by the time a corresponding line or a portion of the image is displayed, and that may reflect on what kind of images (luminance, color, etc.) may be used for testing. The image light carries modified images such that, for each eye of the user, a sum of the respective modified image and the respective test image equals to an image to be displayed to the eye of the user. The detection unit is synchronized with providing the test light by the projection units 1141, for detecting the test images substantially independently on the images to be displayed to the eyes of the user.

In some embodiments, test images provided by the projectors 1141, 1142 include reference features having an angular size of less than 1 degree and located within a field of view of the images to be displayed to the user. In embodiments where these test images are in the same wavelength band as the images displayed to the user, the time-domain multiplexing of FIGS. 12A-12D may be employed. For embodiments where the test images are in an invisible spectral band, e.g. NIR, the test images may be displayed simultaneously with the visible images, because the separation is achieved by wavelength division, not time division. The reference features may be periodic, non-periodic, may include pre-defined luminance or color distributions, etc.

Figure 13:
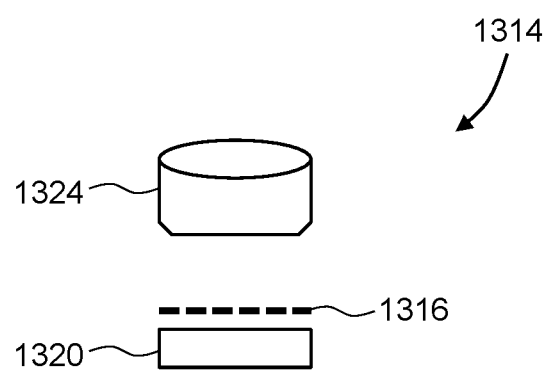
FIG. 13 is a schematic view of a detection unit for a self-testing display device, the detection unit including a reference mask and a photodetector.

Referring now to FIG. 13, a detection unit 1314 is usable in a display of this disclosure that relies on reference patterns having periodic features. The detection unit 1314 includes an objective 1324 for forming at least one of the left or right test images at a focal plane of the objective 1324. The objective 1324 may be any element having a focusing power, such as a lens and/or a diffractive optical element, for example. A mask 1316 may be placed at the focal plane. The mask 1316 may include periodic or aperiodic features, similarly to the amplitude mask 116 of the apparatus 100 of FIG. 1A. A photodetector 1320 may be disposed downstream of the mask 1316 for detecting the test light propagated through the mask 1316. The detection unit 1314 may be used e.g. in the apparatus 100 of FIG. 1A, 600 of FIG. 6, the apparatus 700A of FIG. 7A, the apparatus 700B of FIG. 7B, and the display device 1100 of FIG. 11.

Figure 14:
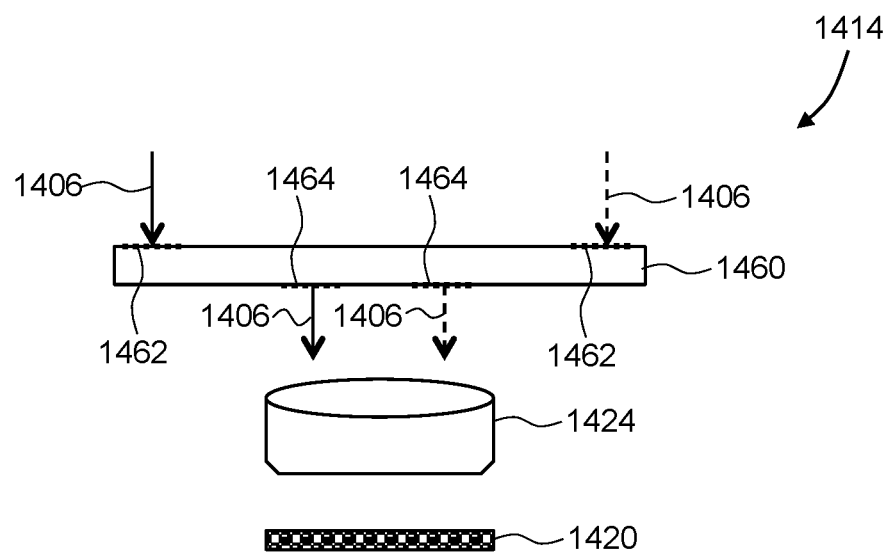
FIG. 14 is a schematic view of a detection unit for a self-testing display device, the detection unit including a photodetector array.

Turning to FIG. 14, a detection unit 1414 is usable in a display of this disclosure. The detection unit 1414 includes an objective 1424 for forming at least one of the left or right test images at a focal plane of the objective 1424. At least one photodetector array 1420 may be provided at the focal plane for detecting the test images carried by the left and/or right waveguides. An optical combiner 1460 may be provided for combining test light 1406 propagated in the left and/or right waveguides and carrying the test images for detecting by the photodetector array 1420. The optical combiner 1460 may include in-coupling areas 1462 optically coupled to the out-coupling areas of the first and second waveguides respectively, and an out-coupling areas 1464 optically coupled to the objective 1424, for directing the test light 1406 out-coupled from the left and right waveguides to the objective 1424 of the detection unit 1414. The optical combiner may include e.g. the prism assembly 750 of FIG. 7A, or a waveguide 760 of FIG. 7B.

Figure 15:
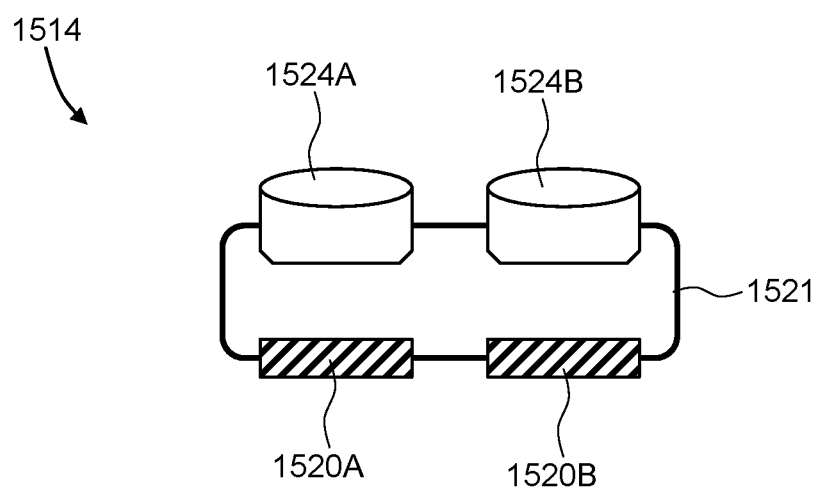
FIG. 15 is a schematic view of a detection unit for a self-testing display device, the detection unit including a pair of rigidly connected objectives.

Referring to FIG. 15, a detection unit 1514 is also usable in a display of this disclosure. The detection unit 1514 includes first 1524A and second 1524B objectives, e.g. a refractive and/or diffractive lens, a curved mirror, etc., forming first and second test images, respectively, at focal planes of the first 1524A and second 1524B objectives, respectively. First 1520A and second 1520B sensing units are disposed at focal planes of the first 1524A and second 1524B objectives respectively, for detecting the respective first and second test images. The sensing units 1520A, 1520B may include, for example, photodetector arrays as in the detection unit 1414 of FIG. 14, or references masks with photodetectors placed downstream of the reference masks, as in the detection unit 1314 of FIG. 13, for example. A rigid mechanical structure 1521, e.g. a housing, a mounting bracket, a mounting beam, a platform, etc., supports the first 1524A and second 1524B objectives and the first 1520A and second 1520B sensing units in a fixed spaced-apart relationship. The purpose of the supporting mechanical structure 1521 is to prevent relative displacement of the components, to enable a reliable detection of shifts of reference images relative to each other and thus to enable a reliable sensing of visual disparity due to mechanical shifts or tilts of waveguides of the display, or for any other reason.

Figure 16:
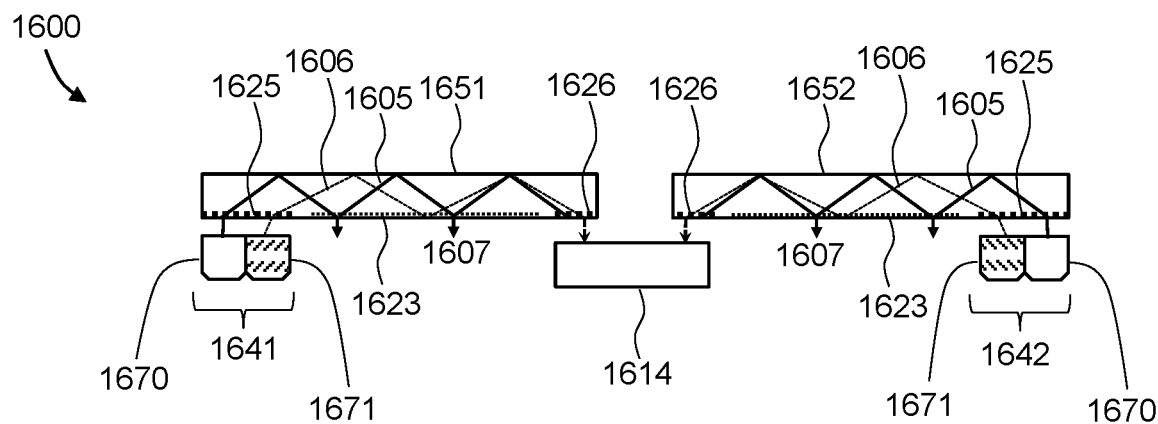
FIG. 16 is a schematic top view of a self-testing display device, the detection unit including separate projectors for image light and test light.

Referring now to FIG. 16, a display device 1600 includes first 1641 and second 1642 projection units for providing image light 1605 carrying images to be displayed to left and right eyes of a user respectively, and test light 1606 carrying first and second test images, respectively. First 1651 and second 1652 waveguides are configured for co-propagating both the image light 1605 and the test light 1606 provided by the first 1641 and second 1642 projection units respectively. Each one of the first 1651 and second 1652 waveguides include an in-coupling area 1625 for in-coupling the test light 1606 from the respective projection unit, which optionally also in-couple the image light 1605, and an out-coupling area 1626 for extracting the test light 1606 from the waveguides 1651, 1652. The in-coupling 1625 and out-coupling 1626 areas may include grating structures, e.g. surface-relief gratings or volume gratings. The first 1651 and second 1652 waveguides also include image light 1605 out-coupling gratings 1623, for out-coupling portions 1607 of the image light 1605 for observation of the images by the user.

A detection unit 1614 is configured for receiving the test light 1606 out-coupled from the first 1651 and second 1652 waveguides, and for detecting the first and second test images. The detection unit 1614 may include an objective for forming at least one of the first and second test images at a focal plane of the objective, and at least one photodetector array at the focal plane of the objective for detecting the test light 1606 emitted by at least one of the first 1641 or second 1642 projection units. The photodetector array may be color-selective. The detection unit 1614 may include any detection units described herein, e.g. those described with reference to FIG. 1A, FIG. 5, FIGS. 7A-7B, and FIGS. 13-15.

In the embodiment shown in FIG. 16, each one of the first 1641 and second 1642 projection units includes a couple of projectors: an image light projector 1670 for emitting the visible image light 1605, and a test light projector 1671 for emitting the test light 1606. The test light projectors 1671 may emit invisible light, e.g. NIR light in the wavelength range of between 700 nm and 1100 nm, or, in some embodiments, the test light projectors 1671 may emit visible light in any portion of the wavelength range of between 360 nm and 700 nm, or in the entire visible wavelength range, for complete testing of the color performance of the display device 1600. Alternatively, each one of the first 1641 and second 1642 projection units may include only one projector capable of emitting both the image light 1605 and the test light 1606. For instance, the first 1641 and second 1642 projection units may each include a 2D array of emitters, some emitters of the 2D array of emitters emitting the image light and some emitters of the 2D array of emitters emitting the test light.

Figure 17:
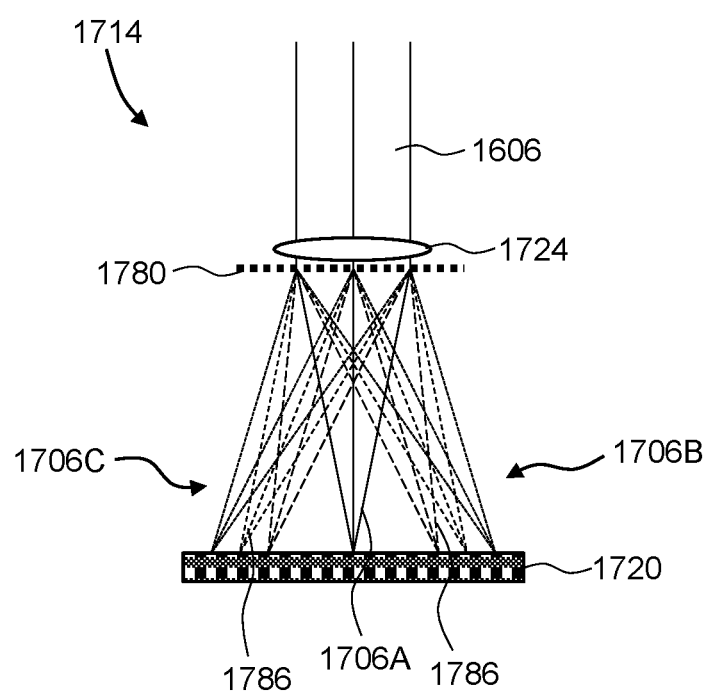
FIG. 17 is a schematic side view of a detection unit for a self-testing display device, the detection unit including a wavelength-dispersive optical element.

Turning to FIG. 17, a detection unit 1714 is a variant of the detection unit 1614 of FIG. 16. The detection unit 1714 of FIG. 17 includes a wavelength-dispersive device 1780 disposed proximate an objective 1724 (upstream or downstream) for angularly dispersing the test light 1606 into separate wavelength components of the test light 1606. In the embodiment shown, the wavelength-dispersive device 1780 includes a diffraction grating that may have several orders of diffraction. A portion 1706A of the test light 1606 is directed to a $0^{th}$ order of diffraction, is not wavelength dispersed, and thus may be used for binocular disparity evaluation. Portions 1706B, 1706C of the test light 1606 are directed to $1^{st}$ and $-1^{st}$ diffraction orders respectively, and are dispersed into individual wavelength components 1786. To detect the individual wavelength components 1786, the detection unit 1714 may further include a photodetector array 1720 disposed at the focal plane of the objective 1724.

Such a configuration enables real-time spectral analysis of the test light 1706. Alternative configurations may include, for example, a diffuser or scatterer coupled to a color-sensitive photodetector array.

Figure 18:
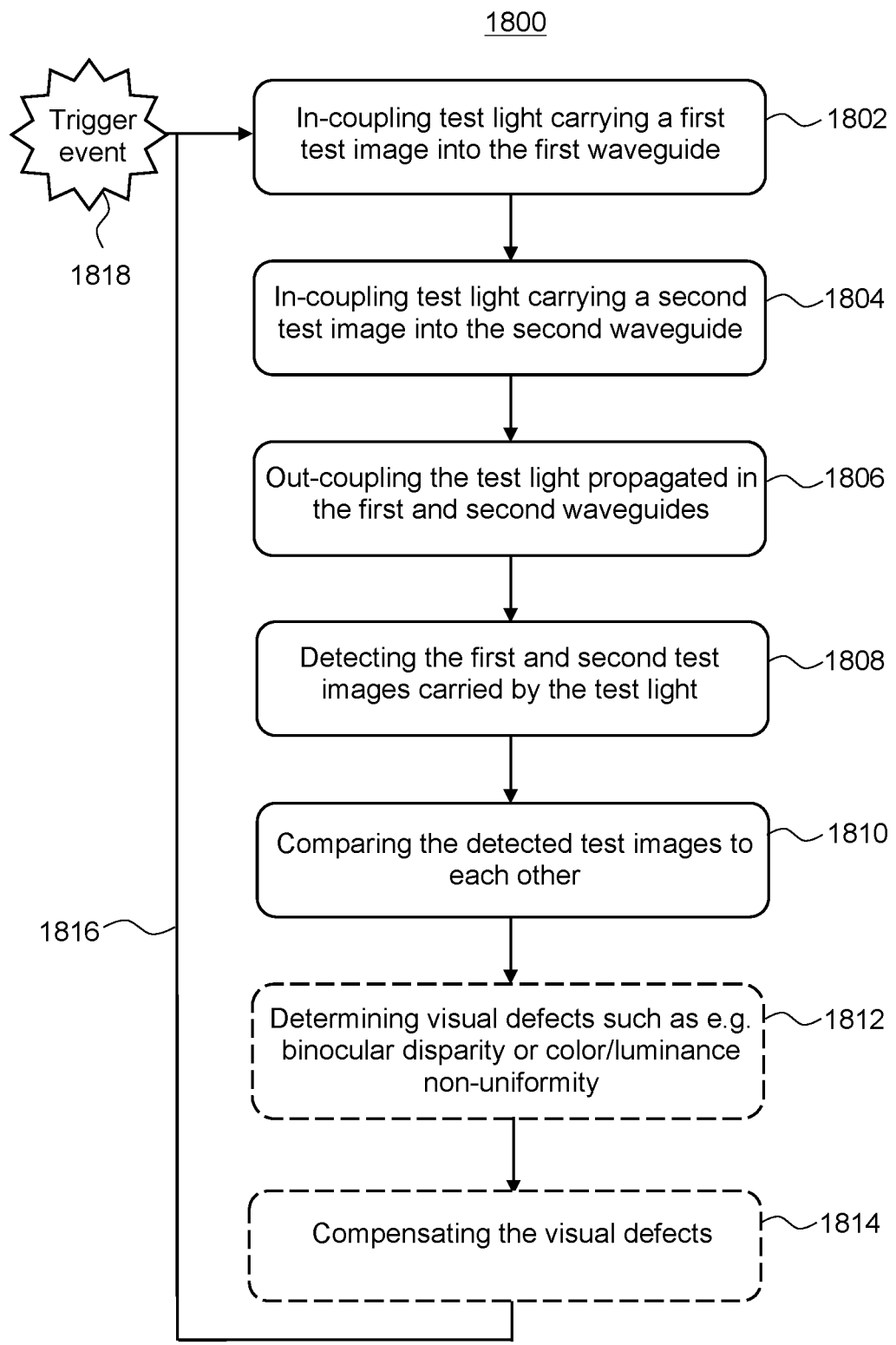
FIG. 18 is a flow chart of a method for detecting image artifacts.

Referring now to FIG. 18, a method 1800 for detecting an artifact in an image displayed to a user is presented. The method 1800 may be performed with any display device or apparatus described herein, e.g. the apparatus 100 of FIG. 1A, the apparatus 500 of FIG. 5A, the apparatus 600 of FIG. 6, the apparatus 700A of FIG. 7A, the apparatus 700B of FIG. 7B, the near-eye display 900 of FIGS. 9A-9B, the near-eye display 1000 of FIGS. 10A-10B, the display device 1100 of FIG. 11, etc. The method 1800 may be performed using any of the detection units considered herein, including without limitation the detection unit 1314 of FIG. 13, the detection unit 1414 of FIG. 14, the detection unit 1514 of FIG. 15, or the detection unit 1614 of FIG. 16.

In an embodiment, the method 1800 includes in-coupling (1802) test light carrying a first test image into a first waveguide configured for providing an image to a left eye of the user; in-coupling (1804) test light carrying a second test image into the second waveguide configured for providing an image to a right eye of the user; out-coupling (1806) the test light propagated in the first and second waveguides; and detecting (1808) the first and second test images carried by the test light. The first and second test images may be compared (1810) to each other to determine differences that may be indicative of binocular disparity, or any other detectable visual defect or disparity. For example, positions of reference features of the first and second test images may be indicative of binocular disparity of the display device, and/or a color or intensity distribution differences of test images may be indicative of color or luminance disparity between images presented to left and right eyes of the user. In some cases like generic color/intensity uniformity tracking, the comparing step 1810 may be omitted, and the color/luminance uniformity is determined for each eye separately. Once the visual disparity or another visual defect has been determined (1812), the images to be displayed to left and right eyes of the user may be adjusted (1814) to lessen such visual defects. For example, the images may be shifted relative to one another to lessen the binocular disparity. The color/luminance distribution of the images may be pre-emphasized to offset the detected color/luminance non-uniformity in the test images. The process may be repeated (1816) until the binocular disparity or another visual defect, as the case may be, has been reduced beyond a detection threshold.

For the purpose of color or luminance calibration, the first and second test images may each include a pre-defined distribution of color and/or luminance across a field of view of the display device. The defect determination step 1812 may include comparing the distribution of color and/or luminance to target values. A deviation from the target may indicate the color and/or luminance non-uniformity across the field of view of the display.

In some embodiments, the method 1800 is invoked at regular time intervals, e.g. every minute, hour, every day, every week, every month, etc. The method 1800 may also be invoked in response to a triggering event 1818 such as, for example, a physical parameter of the display device exceeding a threshold, turning on the display device, turning off the display device, etc. The physical parameter of the display device may include at least one of acceleration, temperature variation, humidity variation, or ambient light level variation. The event triggering the display checking and re-adjustment may be any event having a capacity of inducing some image artifact such as mechanical shock when the display device is knocked over an obstacle or dropped, temperature- or humidity-induced drift of display parameters when the display device is brought into a new environment, a strong variation of ambient light levels, etc.

In embodiments of the method 1800 where the test light is in the visible range, the image light and the test light may be provided in a time-sequential manner, as has been explained above with reference to FIGS. 12A to 12D. The image light may carry first and second modified images such that, for each eye of the user, a sum of the respective modified image and the respective test image equals to an image to be displayed to the eye of the user. The detecting step 1808 may be synchronized with providing the test light by the projection units for detecting the first and second test images substantially independently on the images to be displayed to the eyes of the user. The method 1800 may also include spectrally analyzing the detected test light, for example using the detection unit 1714 of FIG. 17.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 19:
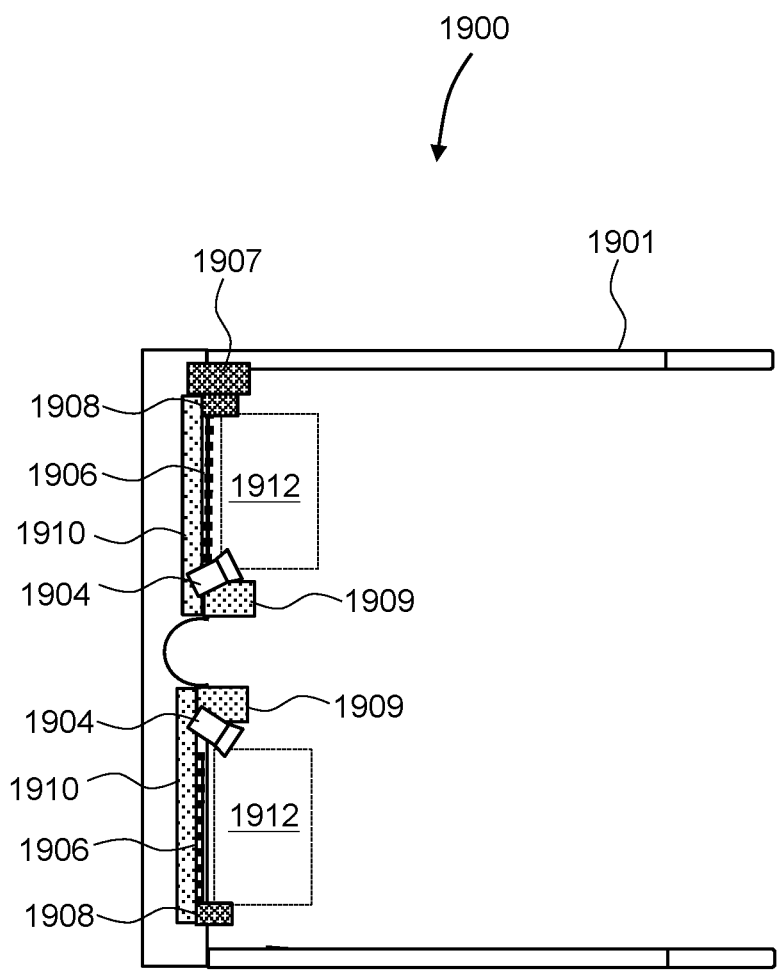
FIG. 19 is a schematic top view of a self-testing near-eye display device incorporating projection and detection units of this disclosure.

Turning to FIG. 19, a near-eye display 1900 includes a frame 1901 having a form factor of a pair of eyeglasses. The frame 1901 supports, for each eye: a projection unit 1908, which may be disposed on the eye side of the frame 1901, and a pupil-replicating waveguide 1910 optically coupled to the projection unit 1908. The projection unit 1908 is configured for displaying images to be observed by the user and, in some embodiments, may be used to generate test images for on-the-fly determination of visual defects as described above. The projection units may include separate dedicated projectors to project test images. A detector assembly 1909 is provided on the opposite end of the waveguide 1910. The left and right detector assemblies 1909 may be combined into a single detection unit located in the nasal or forehead area of the near-eye display 1900. Any detection units disclosed herein, and any display configurations disclosed herein may be used in the near-eye display 1900 in place of the detector assemblies 1909. The detected visual disparity may be compensated by providing corresponding offsets to the images being displayed, and the detected image non-uniformity may be compensated by pre-emphasizing the color and/or luminance distribution in the images being displayed.

In operation, the projection units 1908 provide fans of light beams carrying an image in angular domain to be projected into left and right eyes of the user. The pupil-replicating waveguides 1910 receive the fans of light beams and provide multiple laterally offset parallel copies of each beam of the fan of light beams, thereby extending the projected image over the eyeboxes 1912. For AR applications, the pupil-replicating waveguides 1910 can be transparent or translucent to enable the user to view the outside world together with the images projected into each eye and superimposed with the outside world view. The images projected into each eye may include objects disposed with a simulated parallax, so as to appear immersed into the real world view.

The near-eye display 1900 may further include an eye-tracking camera 1904, for each eye, a plurality of illuminators 1906 for each eye, and an eye-tracking camera controller 1907. The illuminators 1906 may be supported by the pupil-replicating waveguide 1910 for illuminating the eyeboxes 1912. The purpose of the eye-tracking cameras 1904 is to determine position and/or orientation of both eyes of the user. Once the position and orientation of the user's eyes are known, a gaze convergence distance and direction may be determined. The imagery displayed by the projection units may be adjusted dynamically to account for the user's gaze, for a better fidelity of immersion of the user into the displayed augmented reality scenery, and/or to provide specific functions of interaction with the augmented reality. In operation, the illuminators 1906 illuminate the eyes at the corresponding eyeboxes 1912, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 1912.

The function of the eye-tracking camera controllers 1907 is to process images obtained by the eye-tracking cameras 1904 to determine, in real time, the eye gazing directions of both eyes of the user. In some embodiments, the image processing and eye position/orientation determination functions may be performed by a central controller, not shown, of the AR near-eye display 1900. The central controller may also provide control signals to the projection units to generate the images to be displayed to the user, depending on the determined eye positions, eye orientations, gaze directions, eyes vergence, etc.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display device comprising:
   first and second projection units for providing test light in a wavelength range between 380 nm and 700 nm, the test light carrying first and second test images, respectively;
   first and second waveguides for propagating image light carrying images to be displayed to left and right eyes of a user respectively, the first and second waveguides each comprising:
      an in-coupling area for in-coupling the test light from the respective projection unit; and
      an out-coupling area for out-coupling the test light from the waveguide; and
   a detection unit for receiving the test light out-coupled from the first and second waveguides, and for detecting the first and second test images;
   wherein the first and second projection units are configured for providing the image light and the test light in a time-sequential manner, wherein the image light carries first and second modified images such that, for each eye of the user, a sum of the respective modified image and the respective test image equals to an image to be displayed to the eye of the user, wherein the detection unit is synchronized with providing the test light by the first and second projection units, for detecting the first and second test images substantially independently of the images to be displayed to the eyes of the user.

2. The display device of claim 1, wherein:
   the display device is a headset to be worn on a head of the user;
   the first and second projection units are located in a temporal region of the headset; and the detection unit is located in a nasal region of the headset.

3. The display device of claim 1, wherein the first and second test images each comprise reference features having an angular size of less than 1 degree and located within a field of view of the images to be displayed to the left and right eyes of the user.

4. A display device comprising:
first and second projection units for providing test light carrying first and second test images, respectively, the first and second test images each comprising periodic features;
first and second waveguides for propagating image light carrying images to be displayed to left and right eyes of a user respectively, the first and second waveguides each comprising:
an in-coupling area for in-coupling the test light from the respective projection unit; and
an out-coupling area for out-coupling the test light from the waveguide; and
a detection unit for receiving the test light out-coupled from the first and second waveguides, and for detecting the first and second test images, the detection unit comprising:
an objective for forming at least one of the first and second test images at a focal plane of the objective;
a mask at the focal plane, the mask comprising periodic features; and
a photodetector downstream of the mask for detecting the test light propagated through the mask.

5. A display device comprising:
first and second projection units for providing test light carrying first and second test images, respectively;
first and second waveguides for propagating image light carrying images to be displayed to left and right eyes of a user respectively, the first and second waveguides each comprising:
an in-coupling area for in-coupling the test light from the respective projection unit; and
an out-coupling area for out-coupling the test light from the waveguide; and
a detection unit for receiving the test light out-coupled from the first and second waveguides, and for detecting the first and second test images, the detection unit comprising:
an objective for forming the first and second test images at a focal plane of the objective; and
at least one photodetector array at the focal plane for detecting the first and second test images.

6. The display device of claim 5, wherein the detection unit further comprises an optical combiner including first and second in-coupling areas optically coupled to the out-coupling areas of the first and second waveguides respectively, and an out-coupling area optically coupled to the objective, for directing the test light out-coupled from the first and second waveguides to the objective of the detection unit.

7. The display device of claim 6, wherein the optical combiner comprises a waveguide having the first and second in-coupling areas at opposed ends of the waveguide, and the out-coupling area between the first and second in-coupling areas.

8. The display device of claim 6, wherein the optical combiner comprises first and second prismatic elements having the first and second in-coupling areas, respectively, and having first and second out-coupling areas, respectively;
wherein the out-coupling areas of the first and second prismatic elements are disposed proximate each other, forming the out-coupling area of the optical combiner.

9. A display device comprising:
first and second projection units for providing test light carrying first and second test images, respectively;
first and second waveguides for propagating image light carrying images to be displayed to left and right eyes of a user respectively, the first and second waveguides each comprising:
an in-coupling area for in-coupling the test light from the respective projection unit; and
an out-coupling area for out-coupling the test light from the waveguide; and
a detection unit for receiving the test light out-coupled from the first and second waveguides, and for detecting the first and second test images, the detection unit comprising:
first and second objectives for forming the first and second test images, respectively, at focal planes of the first and second objectives, respectively;
first and second sensing units at the focal planes of the first and second objectives respectively, for detecting the first and second test images, respectively; and
a mechanical structure rigidly supporting the first and second objectives and the first and second sensing units in a spaced-apart relationship.

10. The display device of claim 9, wherein each one of the first and second sensing units comprises:
an objective for forming a respective one of the first and second test images at a focal plane of the objective;
a mask at the focal plane; and
a photodetector downstream of the mask for detecting the test light propagated through the mask.

11. The display device of claim 9, wherein the first and second sensing units each comprise:
an objective for forming the respective one of the first and second test images at a focal plane of the objective; and
a photodetector array at the focal plane for detecting the respective test images.

12. The display device of claim 1, further comprising a controller operably coupled to the detection unit;
wherein the first and second test images each comprise a reference feature having a pre-defined position; and
wherein the controller is suitably configured to determine visual disparity between images displayed to left and right eyes of the user by comparing the positions of the reference features in the first and second test images detected by the detection unit.

13. A display device comprising:
first and second projection units for providing test light carrying first and second test images, respectively;
first and second waveguides for propagating image light carrying images to be displayed to left and right eyes of a user respectively, the first and second waveguides each comprising:
an in-coupling area for in-coupling the test light from the respective projection unit; and
an out-coupling area for out-coupling the test light from the waveguide;
a detection unit for receiving the test light out-coupled from the first and second waveguides, and for detecting the first and second test images; and
a controller operably coupled to the detection unit;
wherein the first and second test images each comprise a pre-defined distribution of at least one of luminance or color across a field of view of the display device; and wherein the controller is suitably configured to determine at least one of luminance or color uniformity across the field of view of the display device based on the test images detected by the detection unit.

14. A display device comprising:
first and second projection units for providing image light carrying images to be displayed to left and right eyes of a user respectively, and test light carrying first and second test images, respectively, both the test light and the image light being within a wavelength range of between 360 nm and 700 nm;
first and second waveguides for propagating both the image light and the test light provided by the first and second projection units respectively, the first and second waveguides each comprising:
an in-coupling area for in-coupling the test light from the respective projection unit; and
an out-coupling area for out-coupling the test light from the waveguide; and
a detection unit for receiving the test light out-coupled from the first and second waveguides, and for detecting the first and second test images, the detection unit comprising an objective for forming at least one of the first or second test images at a focal plane of the objective, and at least one of:
a color-selective photodetector array at the focal plane of the objective for detecting the test light emitted by at least one of the first or second projection units; or
a wavelength-dispersive device disposed proximate the objective for angularly dispersing the test light into separate wavelength components of the test light.

15. The display device of claim 14, wherein the detection unit comprises the wavelength-dispersive device, wherein the wavelength-dispersive device comprises a diffraction grating.

16. The display device of claim 14, wherein the detection unit comprises the wavelength-dispersive device and a photodetector array at the focal plane of the objective for individual detection of the wavelength components of the test light.

17. A display device comprising:
first and second projection units for providing image light within a wavelength range of between 360 nm and 700 nm, the image light carrying images to be displayed to left and right eyes of a user respectively, and test light within a wavelength range between 700 nm and 1100 nm, the test light carrying first and second test images, respectively;
first and second waveguides for propagating both the image light and the test light provided by the first and second projection units respectively, the first and second waveguides each comprising:
an in-coupling area for in-coupling the test light from the respective projection unit; and
an out-coupling area for out-coupling the test light from the waveguide; and
a detection unit for receiving the test light out-coupled from the first and second waveguides, and for detecting the first and second test images;
wherein the first and second projection units each comprise at least one of:
a 2D array of emitters, some emitters of the 2D array of emitters emitting the image light and some emitters of the 2D array of emitters emitting the test light; or
a visible light projector for emitting the image light and an infrared light projector for emitting the test light.

18. A method for detecting an image artifact in images displayed to a user by a display device comprising first and second waveguides for conveying the images to left and right eyes of the user respectively, the method comprising:
in-coupling test light carrying a first test image into the first waveguide;
in-coupling test light carrying a second test image into the second waveguide, wherein the first and second test images each comprise a pre-defined distribution of at least one of luminance or color across a field of view of the display device;
out-coupling the test light propagated in the first and second waveguides;
detecting the first and second test images carried by the test light; and
determining at least one of luminance or color uniformity across the field of view of the display device based on the detected first and second test images.

19. The method of claim 18, further comprising comparing the first and second test images to each other.

20. The method of claim 18, further comprising comparing positions of reference features of the first and second test images to determine a binocular disparity of the display device.

21. The method of claim 20, further comprising shifting, relative to one another, the images to be displayed to left and right eyes of the user, to lessen the binocular disparity of the display device.

22. The method of claim 18, further comprising pre-compensating at least one of luminance or color distribution of the images to be displayed to left and right eyes of the user to improve the at least one of luminance or color uniformity across the field of view of the display device.

23. The method of claim 18, further comprising repeating the in-coupling of the test light into the first and second waveguides, out-coupling the test light propagated in the first and second waveguides, and detecting the first and second test images at regular time intervals.

24. The method of claim 18, further comprising performing the in-coupling of the test light into the first and second waveguides, out-coupling the test light propagated in the first and second waveguides, and detecting the first and second test images in response to a triggering event.

25. The method of claim 24, wherein the triggering event comprises at least one of: a physical parameter of the display device exceeding a threshold, turning on the display device, or turning off the display device.

26. The method of claim 25, wherein the physical parameter comprises at least one of: acceleration, temperature variation, humidity variation, or ambient light level variation.

27. The method of claim 18, wherein:
the test light is in a wavelength range between 380 nm and 700 nm; and
the image light and the test light are provided in a time-sequential manner, wherein the image light carries first and second modified images such that, for each eye of the user, a sum of the respective modified image and the respective test image equals to an image to be displayed to the eye of the user, wherein the detecting is synchronized with providing the test light for detecting the first and second test images substantially independently on the images to be displayed to the eyes of the user.

28. The method of claim 18, further comprising spectrally analyzing the out-coupled test light.

29. The method of claim 18, wherein the test light is in a wavelength range between 700 nm and 1100 nm.

* * * * *